(12) United States Patent
Park et al.

(10) Patent No.: US 9,342,236 B2
(45) Date of Patent: May 17, 2016

(54) MOBILE TERMINAL RECEIVING TAP GESTURE ON EMPTY SPACE AND CONTROL METHOD THEREOF

(71) Applicant: LG ELECTRONICS INC., Seoul (KR)

(72) Inventors: Jongseok Park, Seoul (KR); Jinhae Choi, Seoul (KR); Andy Kim, Seoul (KR); Chulbae Lee, Seoul (KR); Yoosok Saw, Seoul (KR); Hyunghoon Oh, Seoul (KR); Eunyoung Kim, Seoul (KR); Younghoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/176,713

(22) Filed: Feb. 10, 2014

(65) Prior Publication Data
US 2015/0019963 A1 Jan. 15, 2015

(30) Foreign Application Priority Data
Jul. 9, 2013 (KR) .......................... 10-2013-0080560

(51) Int. Cl.
*G06F 3/043* (2006.01)
*G06F 3/048* (2013.01)
(Continued)

(52) U.S. Cl.
CPC .............. *G06F 3/0488* (2013.01); *G06F 3/043* (2013.01); *G06F 3/0433* (2013.01); *G06F 3/04883* (2013.01); *G06F 9/4446* (2013.01); *H04L 41/22* (2013.01); *H04M 1/72519* (2013.01); *H04M 2250/22* (2013.01); *H04M 2250/56* (2013.01)

(58) Field of Classification Search
CPC ... G06F 3/04883; G06F 3/043; G06F 3/0488; G06F 3/0433; G06F 9/4446; H04M 1/72519; H04M 2250/22; H04M 2250/56; H04L 41/22
USPC .................................................. 715/863, 864
See application file for complete search history.

(56) References Cited

U.S. PATENT DOCUMENTS 8,339,377 B1 * 12/2012 Cselle et al. ................... 345/173
2003/0146907 A1 * 8/2003 Boals et al. .................... 345/179
(Continued)

FOREIGN PATENT DOCUMENTS

KR 10-2010-0052378 A 5/2010
KR 10-2010-0081575 A 7/2010

OTHER PUBLICATIONS

Ødegård, Andreas; "A tour around my DIY Tasker sidebar UI", Jun. 19, 2013; published Jun. 19, 2013 at http://www.pocketables.com/2013/06/a-tour-around-my-diy-tasker-sidebar-ui.html.*

(Continued)

*Primary Examiner* — Aaron Lowenberger
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a sensing unit configured to sense tapping gestures; a memory configured to store a matching of a plurality of actions to perform with a plurality of tapping gestures; and a controller configured to display a first execution screen on a display unit corresponding to a first function executing on the mobile terminal, and perform a first action on the first function matched with a first type of tapping gestures and perform a second action different than the first action on the first function matched with a second type of tapping gestures.

18 Claims, 24 Drawing Sheets

(51) Int. Cl.
*G06F 3/0488* (2013.01)
*H04M 1/725* (2006.01)
*G06F 9/44* (2006.01)
*H04L 12/24* (2006.01)

(56) References Cited

U.S. PATENT DOCUMENTS

| | | | |
|---|---|---|---|
| 2007/0177803 A1* | 8/2007 | Elias et al. | 382/188 |
| 2008/0122796 A1* | 5/2008 | Jobs et al. | 345/173 |
| 2008/0218535 A1* | 9/2008 | Forstall et al. | 345/690 |
| 2009/0178008 A1* | 7/2009 | Herz et al. | 715/840 |
| 2010/0056272 A1* | 3/2010 | Dutilly et al. | 463/30 |
| 2010/0085216 A1* | 4/2010 | MS | 341/20 |
| 2010/0153879 A1* | 6/2010 | Rimas-Ribikauskas et al. | 715/810 |
| 2010/0309147 A1* | 12/2010 | Fleizach et al. | 345/173 |
| 2012/0166998 A1* | 6/2012 | Cotterill et al. | 715/780 |
| 2013/0174100 A1* | 7/2013 | Seymour et al. | 715/863 |
| 2014/0195943 A1* | 7/2014 | Zheng et al. | 715/768 |
| 2015/0133199 A1* | 5/2015 | Lee | G06Q 30/0241 455/566 |

OTHER PUBLICATIONS

Heo et al., "ForceTap: Extending the Input Vocabulary of Mobile Touch Screens by adding Tap Gestures," Department of Computer Science, KAIST, XP055010529, pp. 113-122.

Leung, "The Mobile Applications Lab is Canada's First Laboratory for Mobile App Development," Techvibes, The Canadian Startup Awards, http://www.techvibes.com/blog/apl-extended-touch-keyboard-2013-06-24, XP002732361, 3 pages.

* cited by examiner

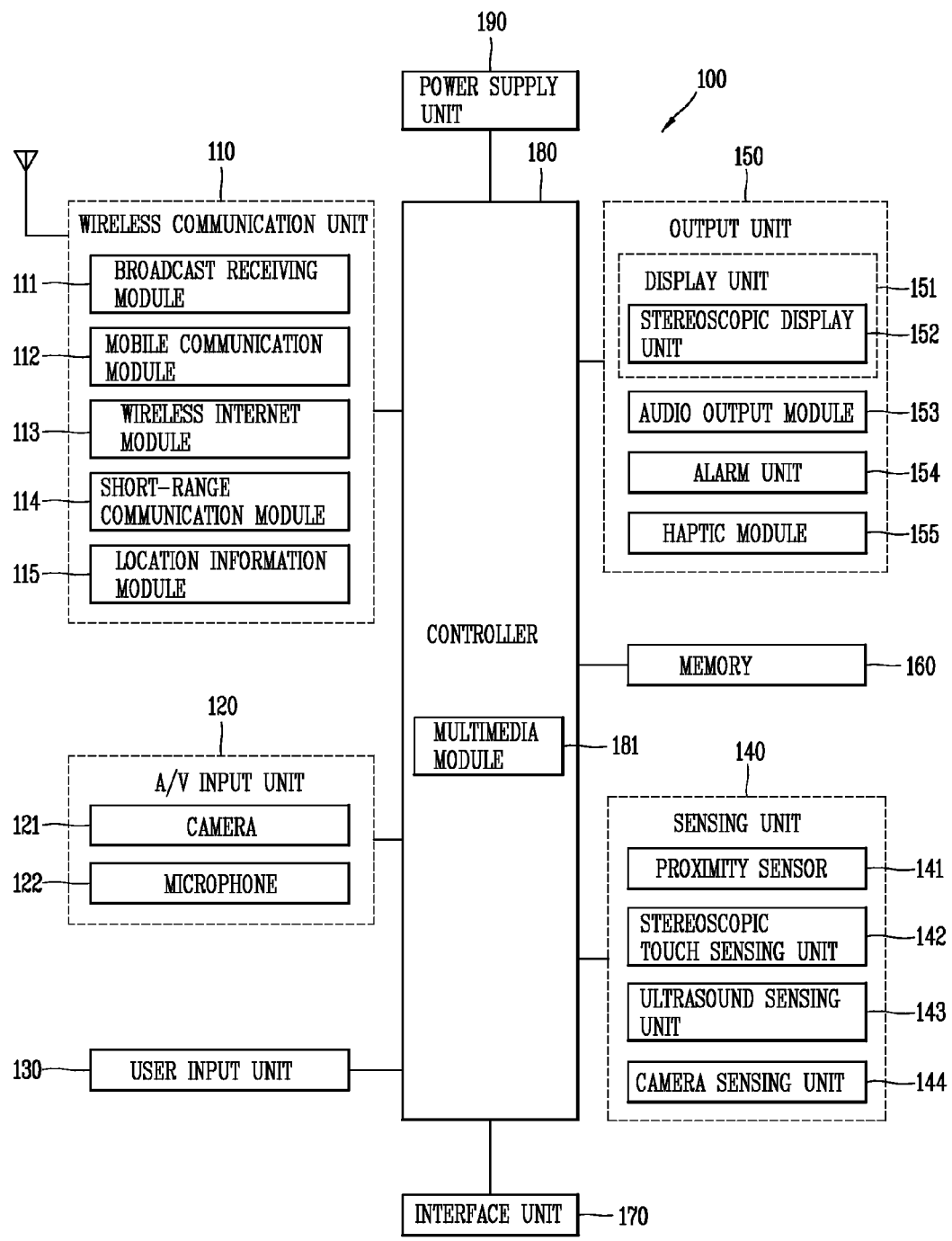

FIG. 13A
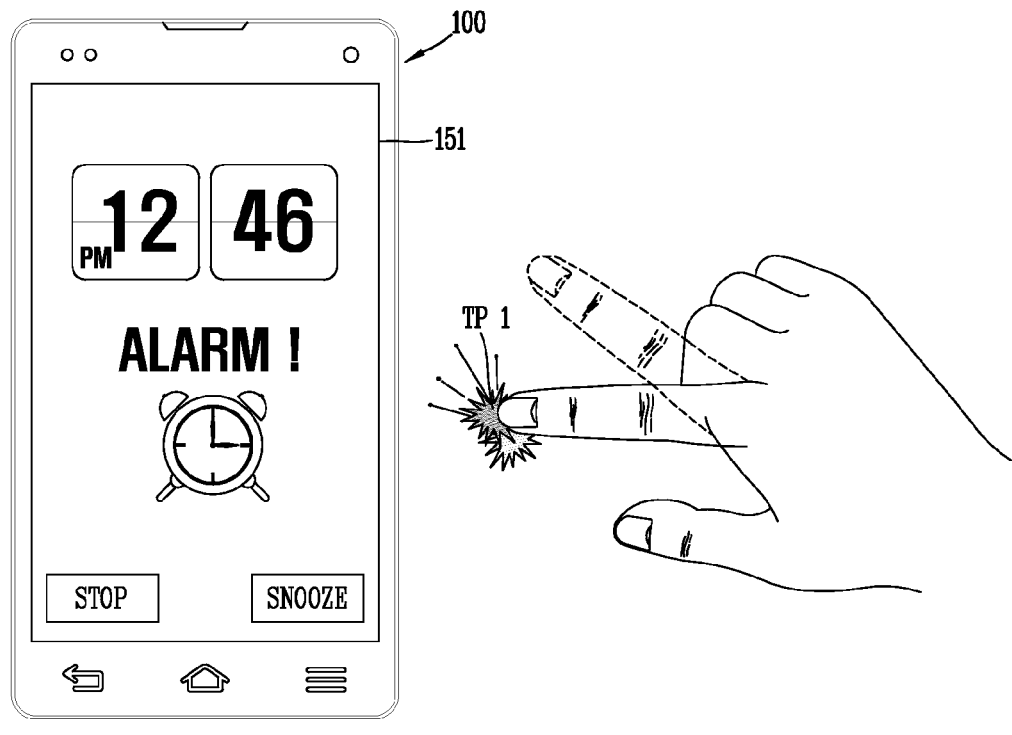
(a)
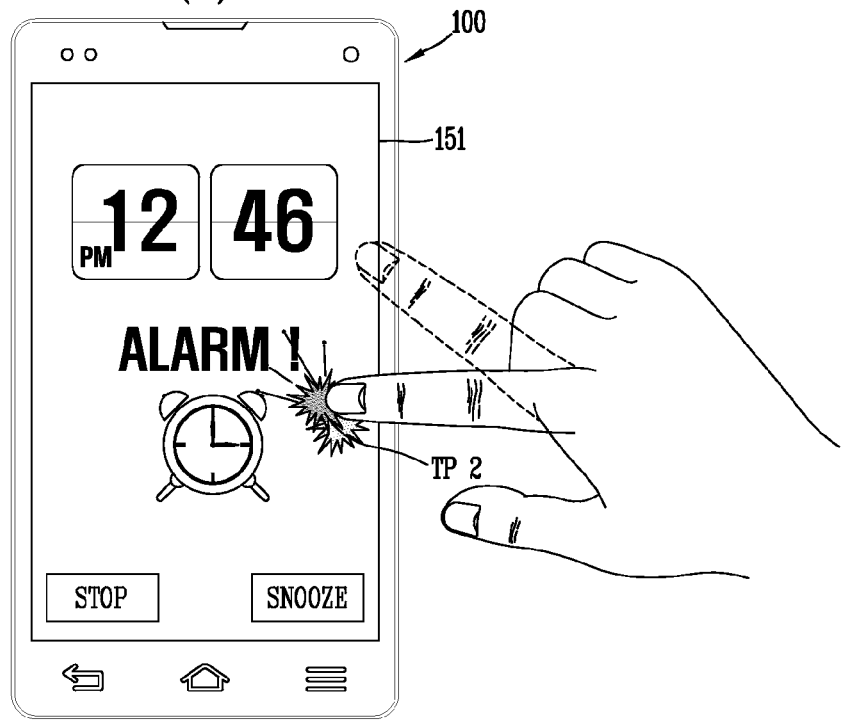
(b)

FIG. 13B
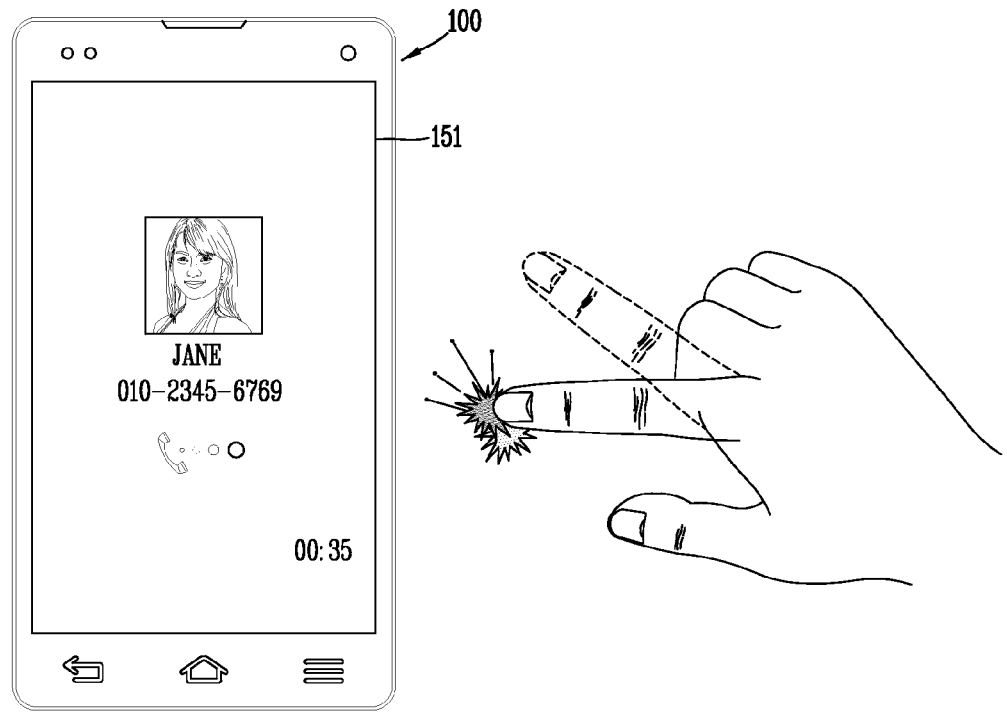
(a)
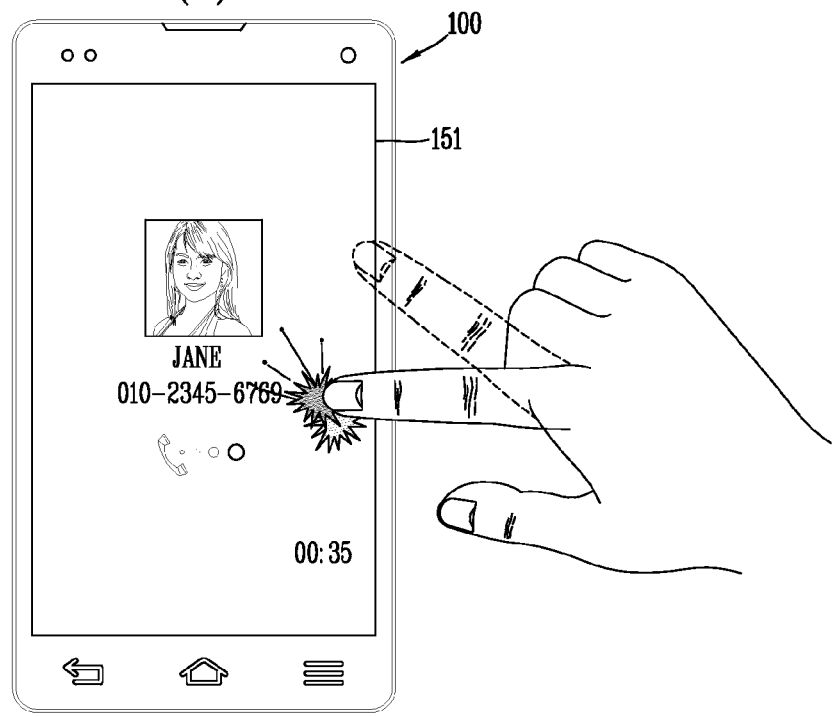
(b)

FIG. 13C
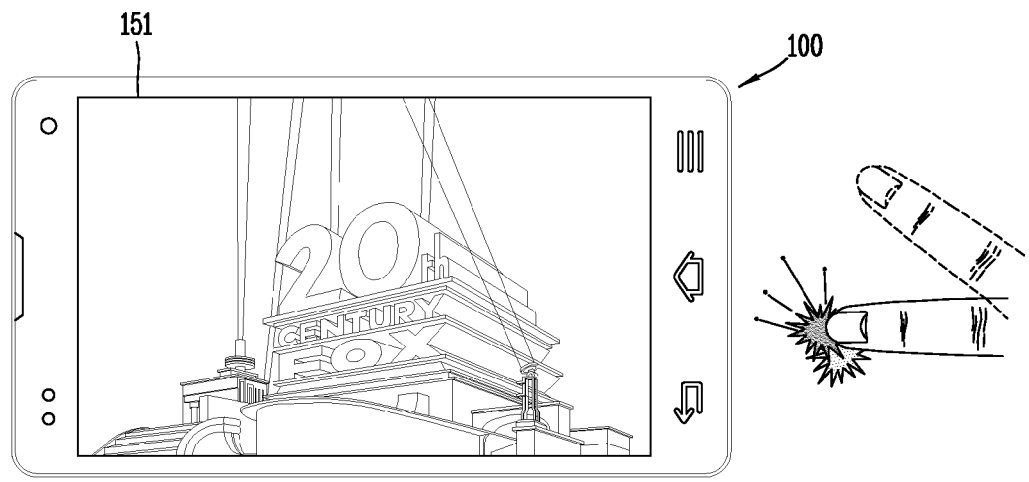
(a)
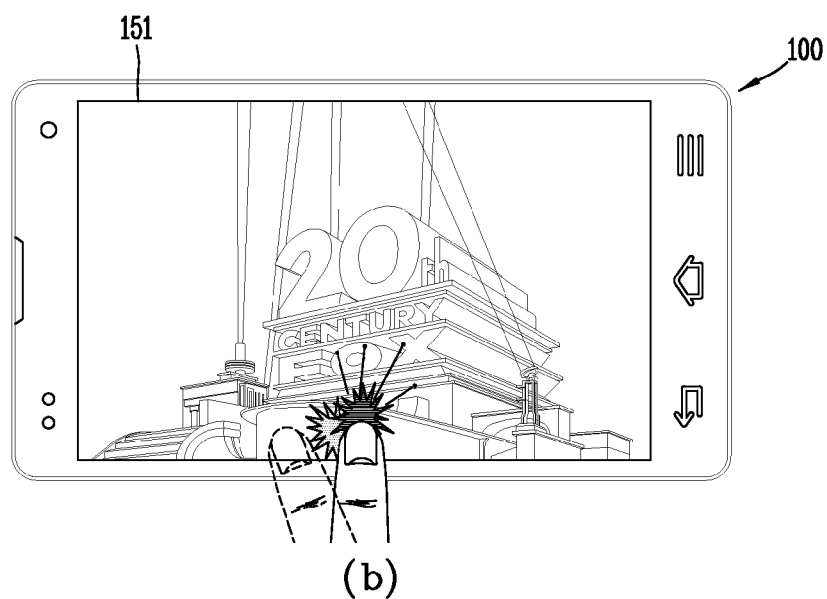
(b)

MOBILE TERMINAL RECEIVING TAP GESTURE ON EMPTY SPACE AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2013-0080560, filed on Jul. 9, 2013, the contents of which is incorporated by reference herein in its entirety.

BACKGROUND OF THE INVENTION

1. Field of the Invention

The present invention relates to a mobile terminal sensing tap gestures of tapping an object and a control method thereof.

2. Description of the Related Art

In general, terminals may be divided into a mobile terminal and stationary terminal. In addition, mobile terminals may be divided into a handheld terminal and a vehicle mount terminal. As such functions become more diversified, the mobile terminal can support more complicated functions such as capturing images or video, reproducing music or video files, playing games, receiving broadcast signals, and the like. The mobile terminal is thus a multimedia player or device.

However, because the mobile terminal now includes so many different functions, it is often difficult to operate and the user interfaces are limited in nature.

SUMMARY OF THE INVENTION

As aspect of the present invention provides a mobile terminal capable of generating a control command based on tap gestures of tapping an object, and a control method thereof.

To achieve these and other advantages and in accordance with the purpose of the present invention, as embodied and broadly described herein, the present invention provides in one aspect a mobile terminal including: a sensing unit configured to sense tap gestures of tapping an object; and a controller configured to execute one or more functions, wherein when the one or more functions are executed, and when continued tap gestures are sensed by the sensing unit within a reference time, the controller controls at least one of the one or more functions being executed and deactivates the display unit.

In an embodiment of the present invention, the controller may stop at least one of the functions in response to the tap gestures.

In an embodiment of the present invention, executed screens may be output to the display unit according to the execution of the one or more functions, and the controller may deactivate the display unit to which the executed screens are output in response to the tap gestures.

In an embodiment of the present invention, the display unit may output screen information, and the controller may control a function corresponding to screen information output to a point to which the tap gestures have been applied.

In an embodiment of the present invention, the display unit may output executed screens according to execution of the one or more functions, wherein the controller may terminate displaying of the executed screen output to the position to which the tap gestures have been applied.

In an embodiment of the present invention, the terminated executed screen may correspond to an executed screen of an application, and the controller may terminate the displaying of the executed screen output to the position to which the tap gestures have been applied, and terminate the driving of the application.

In an embodiment of the present invention, when the executed screens of the one or more functions are not displayed in the position to which the tap gestures have been applied, the controller may deactivate the display unit.

In an embodiment of the present invention, the display unit may output a plurality of executed screens together according to the execution of one or more functions, and the controller may terminate displaying of any one of the plurality of executed screens according to a position to which the tap gestures have been applied.

In an embodiment of the present invention, the any one executed screen may be an executed screen output to a position to which the tap gestures have been applied, among the plurality of executed screens, and the controller may change a display size of at least one executed screen different from the any one of the executed screens as the displaying of the any one of the plurality of executed screens is terminated.

In an embodiment of the present invention, the at least one controlled function may vary according to the number of points to which the tap gestures have been simultaneously applied.

In an embodiment of the present invention, when the tap gestures are sensed, the controller may output guide information regarding functions corresponding to the number of points to which the tap gestures have been simultaneously applied.

In an embodiment of the present invention, the mobile terminal may further include: a memory configured to store function information corresponding to different functions to be executed according to the number of points to which the tap gestures are simultaneously applied, wherein when a user request is received or when the tap gestures are sensed, the controller may output a function information list corresponding to different functions to the display unit with reference to the function information stored in the memory.

In an embodiment of the present invention, based on the user manipulation with respect to the function information list, at least one of the different functions corresponding to the function information list may be changed.

In an embodiment of the present invention, the controller may control different functions among the one or more functions being executed according to the target point to which the tap gestures have been applied.

In an embodiment of the present invention, the target point may include the body of the terminal and a point outside of the body of the terminal.

In an embodiment of the present invention, when the tap gestures are applied to a point outside of the body, a function related to a sound output among the one or more functions being executed may be terminated, and when the tap gestures are applied to the body, functions related to the sound output and a screen display among the one or more functions being executed may be terminated together.

In an embodiment of the present invention, a control command for controlling different functions among the one or more functions being executed may be generated according to strength with which the tap gestures are applied.

In an embodiment of the present invention, the sensing unit may include an accelerometer configured to sense the tap gestures by using a movement of the terminal generated by the tap gestures.

To achieve these and other advantages and in accordance with the purpose of the present invention, as embodied and broadly described herein, the present invention provides in another aspect a method for controlling a mobile terminal. The method includes: outputting executed screens according to execution of one or more functions; continuously sensing tap gestures of tapping an object within a reference time when the executed screens are output; and generating a control signal for executing a function previously matched to the tap gestures.

In an embodiment of the present invention, the previously matched function may vary based on at least one of a target point of the tap gestures, a strength with which the tap gestures are applied, and the number of points to which the tap gestures are simultaneously applied.

In an embodiment of the present invention, any one of functions previously matched to the tap gestures may be a function of terminating at least one of the one or more functions.

According to an embodiment of the present invention, when tap gestures continued within a reference time are sensed, the mobile terminal performs a function previously matched to characteristics of the tap gestures, whereby a novel user interface capable of simply controlling functions of the terminal can be provided.

Also, according to an embodiment of the present invention, since the mobile terminal executes different functions based on at least one of a target point of tap gestures, strength with which tap gestures are applied, and the number of points to which tap gestures are simultaneously applied, various interfaces using tap gestures can be provided.

In addition, according to an embodiment of the present invention, since the mobile terminal senses tap gestures continued within a reference time by using impact generated by tap gestures, although a target point of tap gestures is outside of the body of the terminal, the mobile terminal can sense the tap gestures. For example, with the mobile terminal placed in pockets of trousers, when a call is received, the user may taps the trousers with the terminal held therein to thus refuse the received call.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 1 is a block diagram of a mobile terminal according to an embodiment of the present invention.

FIGS. 13A, 13B, and 13C are conceptual views illustrating examples of operations of the mobile terminal executing different functions according to target points of tap gestures.

DETAILED DESCRIPTION OF THE INVENTION

Figure 2A:
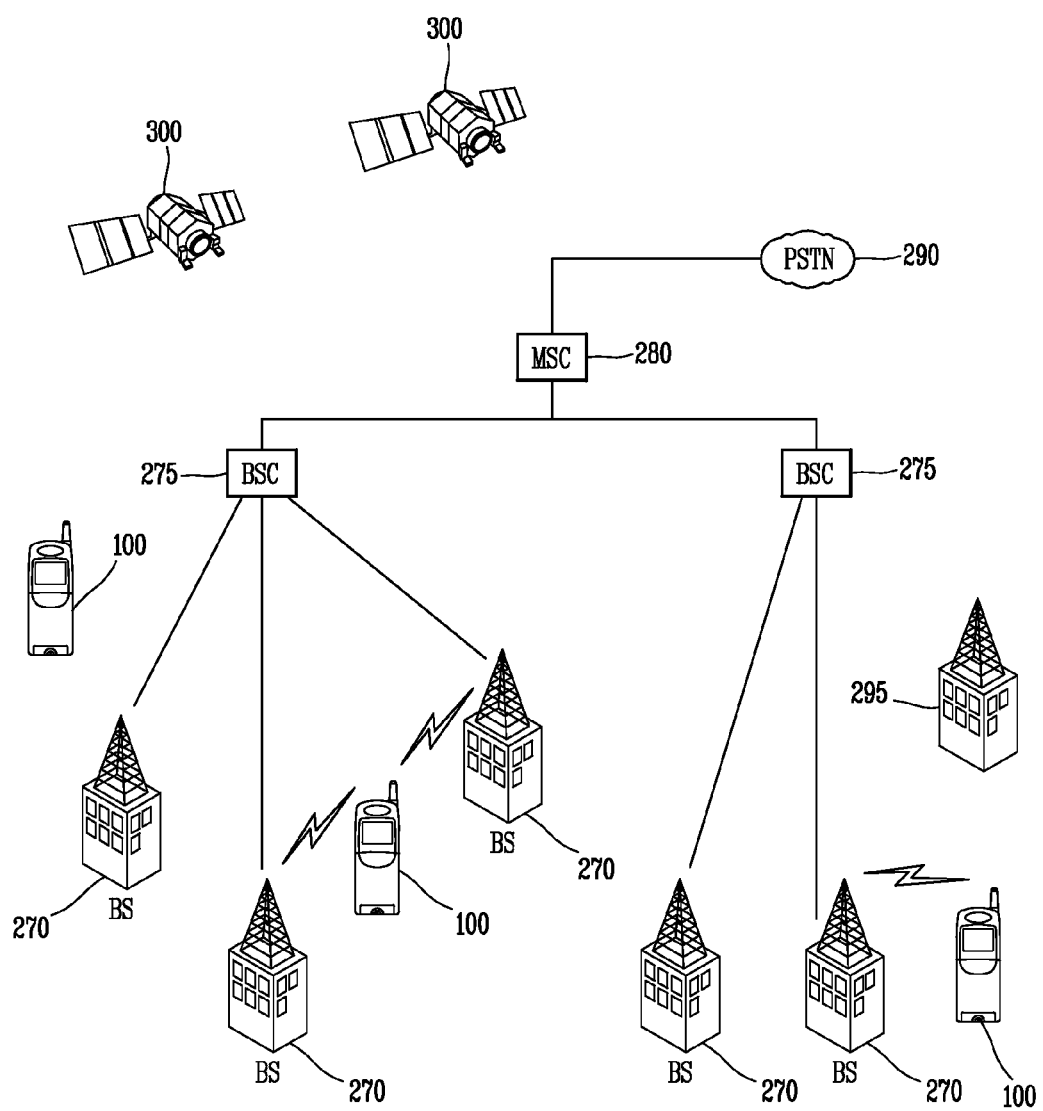
FIGS. 2A and 2B are conceptual views of communication systems in which the mobile terminal according to an embodiment of the present invention is operable.

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present invention may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

FIG. 1 is a block diagram of a mobile terminal according to an embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System) or a WiFi (Wireless Fidelity) module.

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Also, the display unit 151 may be configured as a stereoscopic display unit 152 displaying a stereoscopic image. Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied by a touch subject, as well as the touched position and area on the touch sensor. Here, the touch subject, a subject which applies a touch to the touch sensor, may be, for example, a finger, a touch pen, a stylus pen, a pointer, or the like.

When there is a touch input with respect to the touch sensor, a corresponding signal (signals) are transmitted to a touch controller. The touch controller processes the signals and transmits corresponding data to the controller 180. Accordingly, the controller 180 can recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

When a touch sensor is overlaid on the stereoscopic display unit 152 in a layered manner, or when the stereoscopic display unit and a 3D sensor sensing a touch operation are combined, the stereoscopic display unit 152 may also be used as a 3D input device.

As examples of the 3D sensor, the sensing unit 140 may include the proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 senses pressure applying a touch, and the applied pressure is strong, the stereoscopic touch sensing unit 142 recognizes the touch as a touch with respect to an object positioned to be farther from the touch screen toward the interior of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light, and the ultrasonic sensors may be configured to sense ultrasonic waves. Because light is much faster than ultrasonic waves, light reaches the optical sensor much earlier than ultrasonic waves reach the ultrasonic sensors. Thus, based on light as a reference signal, a position of a wave generation source may be calculated by using a time difference between a time at which light reaches the optical sensor and a time at which ultrasonic waves reach the ultrasonic sensors.

The camera sensing unit 144 includes at least one of a camera, a photo sensor, and a laser sensor. For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In more detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, or other sound generating device.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, to inform about an occurrence of an event. The video or audio signals may be also output via the audio output module 153, so the display unit 151 and the audio output module 153 may be classified as parts of the alai in unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or aim of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perforin a pattern recognition processing to recognize a handwriting input or a picture drawing input performed on the touch screen as characters or images, respectively.

Also, when a state of the mobile terminal satisfies pre-set conditions, the controller 180 can execute a locked state for limiting an input of a control command of the user. Also, in the locked state, the controller 180 can control a locked screen displayed in the locked state based on a touch input sensed through the display unit 151.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a communication system implementable through the mobile terminal 100 according to an embodiment of the present invention will be described.

Figure 2B:
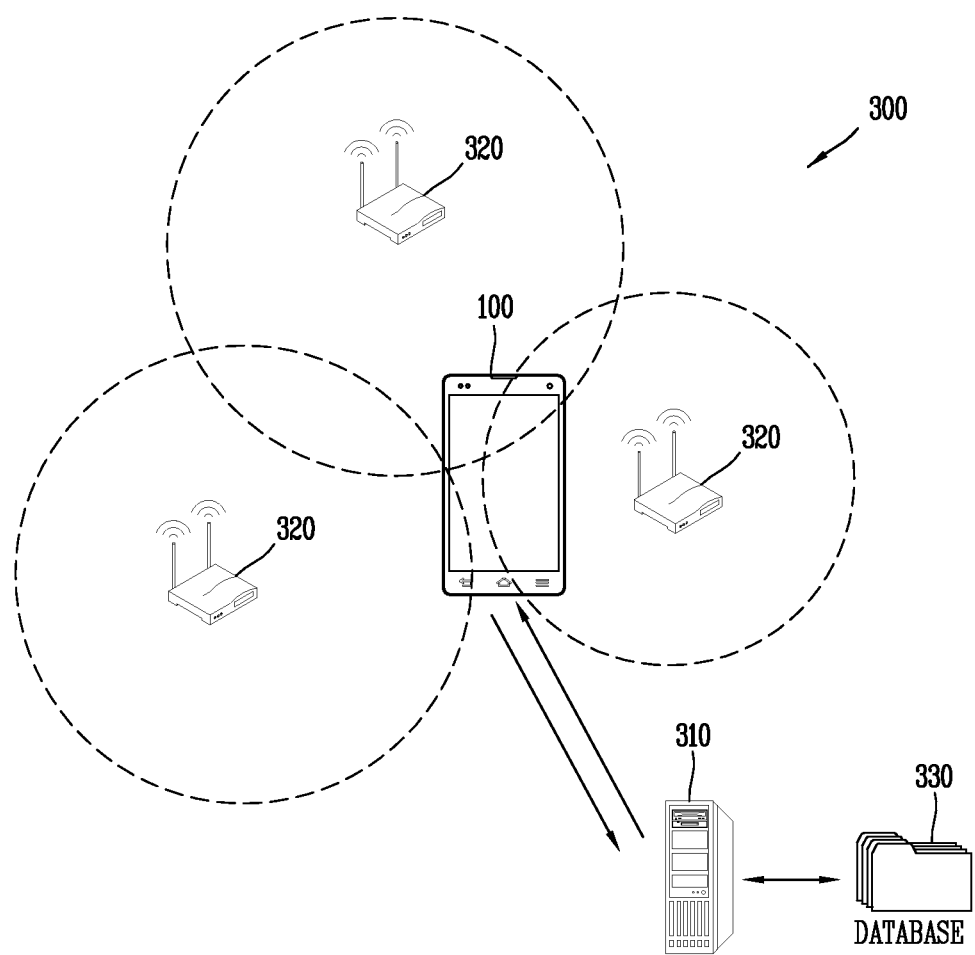

FIGS. 2A and 2B are conceptual views of communication systems in which the mobile terminal 100 according to an embodiment of the present invention is operable.

First, referring to FIG. 2A, a communication system may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Hereinafter, for the description purpose, CDMA will be described, but, obviously, the present invention is applicable to any communication system including a CDMA wireless communication system.

Referring to FIG. 2A, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc.).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2A, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

Also, in FIG. 2A, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B. The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present invention as illustrated in FIG. 1 or a mobile terminal disposed with the constituent elements of the mobile terminal or the structure of a mobile terminal will be described.

Figure 3A:
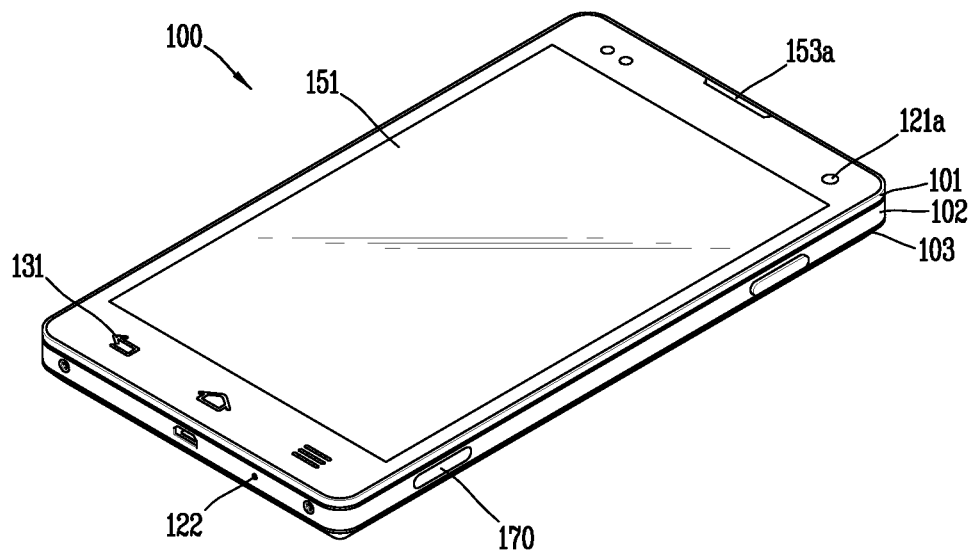
FIG. 3A is a front perspective view of the mobile terminal related to the present invention.

FIG. 3A is a front perspective view illustrating an example of the mobile terminal 100 associated with the present invention. The mobile terminal 100 disclosed herein is provided with a bar-type terminal body. However, the present invention is not limited to this, but also may be applicable to various structures such as watch type, clip type, glasses type or folder type, flip type, swing type, swivel type, or the like, in which two and more bodies are combined with each other in a relatively movable manner.

The terminal body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output module 153a and the first camera 121a are disposed in a region adjacent to one of both ends of the display unit 151, and the first manipulation input unit 131 and the microphone 122 are disposed in a region adjacent to the other end thereof. The second manipulation unit 132 (refer to FIG. 3B), the interface 170, and the like, may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this instance, a hole independently formed to output audio sounds may not be seen or hidden in terms of appearance, thereby further simplifying the appearance of the mobile terminal 100. However, the present invention is not limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

The first manipulation unit 131 is illustrated as a touch key, but the present invention is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
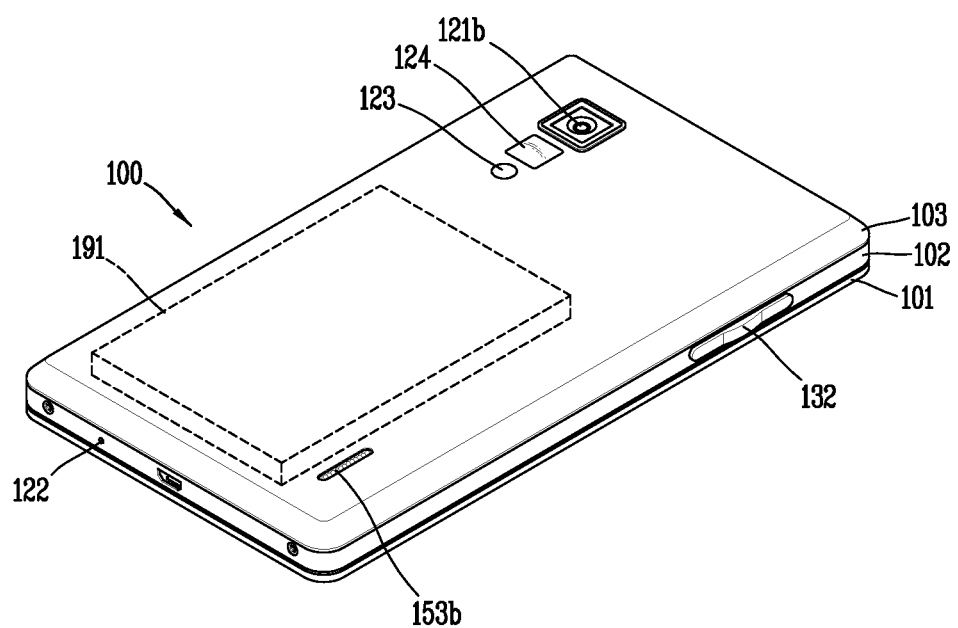
FIG. 3B is a rear perspective view of the mobile terminal illustrated in FIG. 3A.

FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and pop-up manner.

A flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output module 153b may be additionally disposed at a rear surface of the terminal body. The second audio output module 153b together with the first audio output module 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. The battery cover 103 is illustrated as being combined with the rear case 102 to cover the battery 191, thereby restricting the battery 191 from being released and protecting the battery 191 from external shocks and foreign substances.

Meanwhile, in the mobile terminal according to an embodiment of the present invention, one or more functions, which are being executed or which may be executable, may be controlled. Thus, in order to control the one or more functions, the user may not need to apply a manipulation (e.g., a touch input, or the like) with respect to the mobile terminal, and through a simple gesture of tapping an object, one or more functions may be controlled.

Hereinafter, the mobile terminal providing a novel user interface based on tap gestures of tapping an object and a control method thereof will be described in detail with reference to the accompanying drawings.

Figure 4:
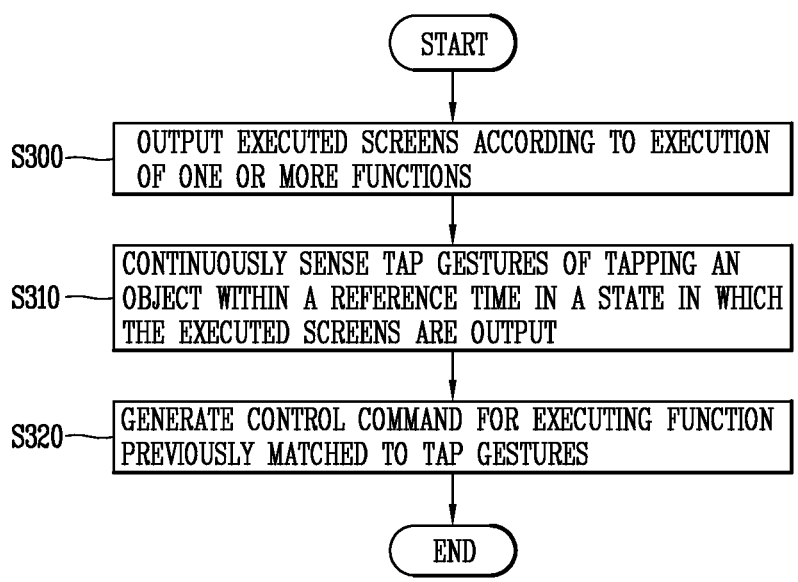
FIG. 4 is a flow chart illustrating an embodiment of the mobile terminal according to an embodiment of the present invention.
Figure 5:
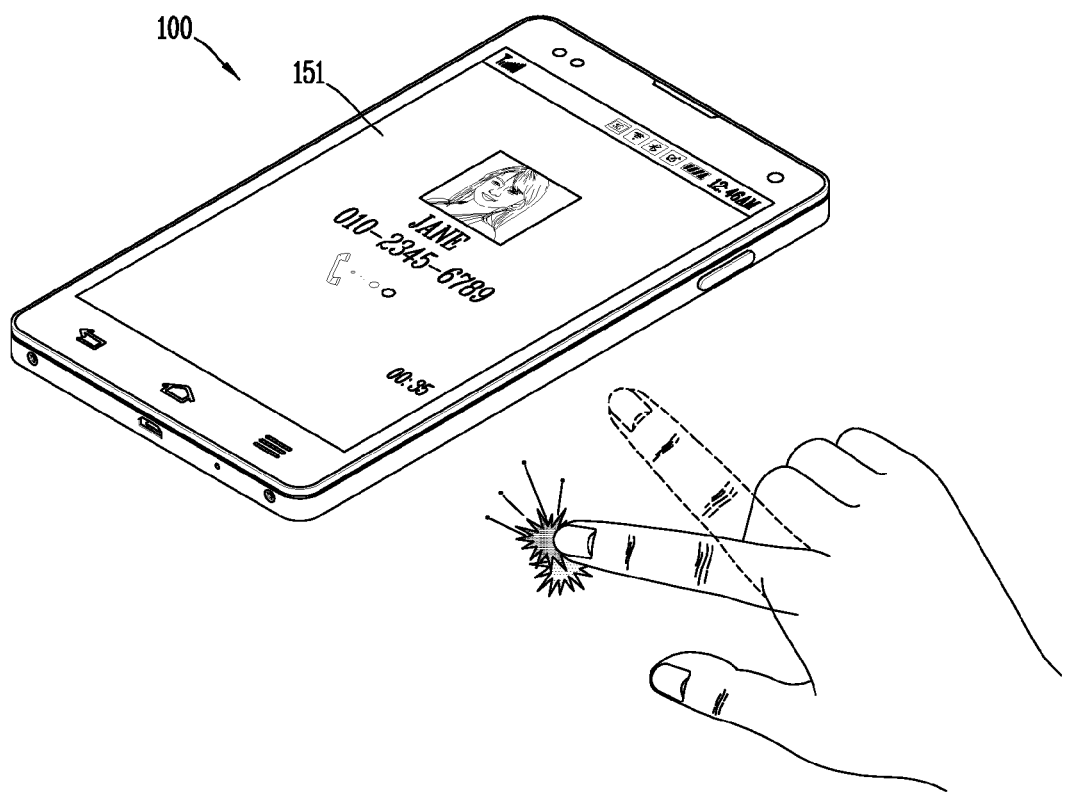
FIG. 5 is a view illustrating an example of an operation of the mobile terminal of FIG. 4.

Next, FIG. 4 is a flow chart illustrating an embodiment of the mobile terminal 100 according to an embodiment of the present invention, and FIG. 5 is a view illustrating an example of an operation of the mobile terminal 100 of FIG. 4. The mobile terminal 100 includes the display unit 151, the sensing unit 140, and the controller 180.

Referring to FIG. 4, in an embodiment of the present invention, as one or more functions are executed, executed screens are output to the display unit 151 of the mobile terminal (S110). Here, the executed screens may be various types of screen information output to the display unit 151. For example, the screen information may be an executed screen of an application, a page screen of a home screen, a menu screen, a screen corresponding to a function executed according to a user request, a notification screen indicating that an event has occurred, a lock screen for preventing malfunction due to an unintentional touch input, and the like.

When an executed screen is output to the display unit 151, tap gestures of tapping an object are continuously sensed within a reference time (S120). In an embodiment of the present invention, the controller 180 can divide an executed screen into a region in which an object is output and a region which is otherwise.

The object refers to a graphic element, and when a touch input is applied to a region in which the graphic element is output, a pre-set control function is executed. For example, an icon, a menu, or the like, may be an object. In this instance, the controller 180 can calculate a region in which tap gestures are sensed in an executed screen. When tap gestures are sensed in a region (an empty space) in which an object is not output, the controller 180 can deactivate the display unit 151.

Here, a tap gesture refers to a gesture of tapping an object. In more detail, a tap gesture may be an operation of flipping an object with a tapping mechanism such as a finger, or the like, or an operation of mildly bringing a tapping mechanism into an object.

Meanwhile, the tapping mechanism applying tap gestures applies an external force to an object, and may be a finger, a stylus pen, a pen, a pointer, a fist, and the like, for example. Meanwhile, the tapping mechanism is not limited to applying a touch input to the mobile terminal and can be anything capable of applying an external force to the object regardless of a type thereof.

Meanwhile, the object to which the tap gesture is applied includes at least one of a body of the mobile terminal, an object on which the mobile terminal is placed, and an object covering the mobile terminal. Further, it may be determined that tap gestures have been sensed only when at least two or more tap gestures are applied within a reference time.

For example, when a single tap gesture is applied by the touch target, the controller 180 can recognize the single tap gesture as a touch input. Namely, the controller 180 can control a function corresponding to the touch input corresponding to the single tap gesture ((e.g., a function of selecting an icon output to a point to which the touch input is applied), rather than controlling a function corresponding to the single tap gesture.

Thus, when at least two or more (or a plurality of) tap gestures are applied continuously within a reference time, the controller 180 can determine that the tap gestures for controlling one or more functions have been sensed. Namely, tap gestures mean that at least two or more tap gestures are continuously sensed within a reference time.

In addition, as well as the tap gestures sensed within the reference time, when tap gestures are applied to a 'predetermined region', the controller 180 can determine that 'tap gestures' have been sensed. For example, the tap gestures may be first and second tap gestures continuously sensed within predetermined region within the reference time.

In addition, the reference time may be a very short time. For example, it may be a time within 300 microseconds to 2 seconds. Also, the predetermined region may be the same point to which the tap gestures have been applied or may be a narrow region considered as the same point.

Thus, when the first tap gesture is sensed by the sensing unit 140, the sensing unit 140 calculates a predetermined region starting from a point in which the first tap gesture was sensed. When the second tap gesture is sensed in the predetermined region within the reference time starting from the point in time at which the first tap gesture was sensed, the sensing unit 140 or the controller 180 can determine that the tap gestures have been sensed.

Also, the sensing unit 140 may count tap gestures sensed within the reference time. For example, when two tap gestures are counted, it may be referred to as a 'double tap gesture' and when three tap gestures are counted, it may be referred to as a 'triple tap gesture'. Tap gestures may also include four or more tap gestures.

In addition, in response to the tap gestures corresponding to different counted numbers as mentioned above, the controller 180 can control different functions. The foregoing reference time and the predetermined region may be variously modified according to an embodiment.

Meanwhile, tap gestures may be applied by one or more tapping mechanisms. In this instance, the sensing unit 140 can calculate points to which the tap gestures was applied, and determine the number of tapping mechanisms which have applied the tap gestures by using the calculated number of tap gestures. For example, the user may tap a single point with one finger or may simultaneously tap first and second points with two fingers. Tap gestures may also be simultaneously applied to three or more points. In this instance, the controller 180 can control different functions according to one or more tapping mechanisms.

Further, in an embodiment of the present invention, tap gestures may be sensed by an accelerometer included in the sensing unit 140. Here, the accelerometer may be a sensor capable of measuring dynamic force such as acceleration, vibrations, impact, and the like, of the terminal body.

Namely, the accelerometer can sense tap gestures applied to an object by sensing a movement (or vibration) of the terminal body generated by the tap gesture, and the controller 180 can determine that the tap gestures have been applied. Thus, the object to which the tap gestures are applied may be the terminal body or an object positioned to be so close to the terminal body that a movement or vibration thereof can be sensed by the accelerometer of the terminal body.

As long as a movement or a vibration can be sensed by the terminal body, although tap gestures are applied to a point outside the terminal body, as well as when the tap gesture is applied to the terminal body, the tap gesture may be sensed.

For example, when the terminal is placed on a table, the user may apply tap gestures by tapping the table. In another example, when the terminal is in a pocket of trousers, the user may apply tap gestures by tapping an outer surface of the trousers.

In addition, the sensing unit 140 including an accelerometer may also sense a direction in which tap gestures are generated or strength of the tap gestures. In this instance, in order to enhance an accuracy of the sensing unit 140, the sensing unit 140 may include a touch sensor, a proximity sensor, a sound sensor, and the like, as well as the accelerometer, and may sense tap gestures by using these sensors together.

FIG. 5 illustrates an embodiment in which tap gestures are applied to the mobile terminal 100 of FIG. 4. Referring to FIG. 5, the display unit 151 outputs an executed screen of an executing function. For example, when a message or a call is received from a counterpart terminal, a message reception screen or a call reception screen is output to the display unit 151.

The controller 180 can output at least one of visual, aural, and haptic information by using at least one of the audio output module 153 and the haptic module 155 included in the output unit 150. Hereinafter, an embodiment in which an output related to visual sensation is generated by using the display unit 151 will be described as an example.

Meanwhile, when an executed screen is output as one or more functions are executed, tap gestures may be applied to the terminal body or points outside the body. For example, when the mobile terminal 100 is placed on a table, the user may apply tap gestures by tapping the table twice successively.

As shown in FIG. 4, when the tap gestures are applied, one or more functions are controlled (S310). Namely, a control command for executing functions previously matched to the tap gestures sensed by the sensing unit 140 are generated (S320). That is, in response to the tap gestures, the controller 180 can control at least one of the one or more functions.

Here, the one or more functions may be controlled in various manners. For example, the one or more functions may be controlled to be executed, terminated (or stopped or interrupted), and deferred. In this instance, the controller 180 can generate different control commands to perform different controlling according to characteristics of the tap gestures as described above.

In addition, the characteristics of the tap gestures include characteristics based on at least one of 1) the number of tap gestures (e.g., double tap gestures or a triple tap gestures) applied within the reference time, 2) the number of tapping mechanisms (e.g., one finger or two fingers) that apply tap gestures, 3) a position or a point to which tap gestures are applied (e.g., the terminal body or a point outside the terminal body), and 4) strength of the tap gestures.

Then, in response to tap gestures sensed by the sensing unit 140, the controller 180 can perform functions matched to the tap gestures, as functions for controlling at least one of the one or more functions.

In an embodiment of the present invention, in response to double tap gestures of tapping the same point twice successively, the controller 180 can terminate at least one or more of the one of more functions being executed in the mobile terminal and deactivate the display unit 151. For example, as illustrated in FIG. 5, when a call is receiving, namely, when a call reception function is being executed, the controller 180 can refuse to receive the call from the counterpart terminal. In addition, the controller 180 can refuse the call and deactivate illumination of the display unit 151.

That is, in response to the tap gestures, the controller 180 can control the display unit 151 to be deactivated. Deactivation of the display unit 151 refers to when illumination provided to illuminate the display unit 151 is in an OFF state and any information or graphic image is not displayed on the display unit 151. When the display unit 151 is deactivated may be referred to as a sleep function (or a sleep mode).

Further, the controller 180 can deactivate the display unit 151 which has displayed an executed screen corresponding to the call function, and stop at least one of an alarm sound (or a bell sound) and vibration output according to the call reception.

As described above, in the mobile terminal according to an embodiment of the present invention, when tap gestures are applied as one or more functions are executed, at least one of the executed functions may be controlled. Thus, the user can control functions through a simple tap gesture, without having to apply a touch manipulation for performing the foregoing controlling to the terminal.

Also, in the mobile terminal 100 according to an embodiment of the present invention, when tap gestures continued within the reference time are sensed, at least one of the one or more functions being executed in the mobile terminal can be controlled in response to the tap gestures.

In addition, in the mobile terminal 100 according to an embodiment of the present invention, by generating a control command according to tap gestures, a novel user interface, different from an existing touch, is provided. Also, because the terminal is controlled through the simple method of tap gestures, the user convenience is enhanced.

In the foregoing embodiment, the method for controlling at least one of one or more functions being executed in the mobile terminal has been described. In the mobile terminal 100 according to an embodiment of the present invention, although a function is not currently executed in the mobile terminal, a new function can be executed or the mobile terminal can enter a particular mode in response to tap gestures.

Hereinafter, various embodiments related to functions matched to characteristics of tap gestures, namely, functions controlled by the controller 180 will be described in detail with reference to FIGS. 6 through 14. Control functions that may be matched to characteristics of tap gestures will be described first.

In the mobile terminal according to an embodiment of the present invention, different functions can be executed according to the characteristics of tap gestures. The different functions may be functions related to an output of the display unit 151. For example, the different functions may include a sleep function, a private function, a quiet function, a power-off function, a window-off function, and the like.

Here, the sleep function refers to a function of deactivating the display unit 151. Deactivation of the display unit 151 can refer to turning off illumination provided within the display unit 151. Meanwhile, when the sleep function is executed and a new event occurs, the controller 180 can generate an output according to the occurrence of the event. For example, when a call is received when the sleep function is executed, a notification sound (or a bell sound) or vibrations indicating the call reception can be output or screen information indicating the call reception can be output to the display unit 151.

Further, when the screen information is output to the display unit 151, the sleep function cannot be executed any longer. Meanwhile, when the sleep function is executed in the mobile terminal 100, illumination of the display unit 151 is turned off, reducing battery consumption. The private function refers to a function of reducing brightness of a screen in order to prevent people near the terminal user from viewing the display unit 151.

Namely, the private function refers to a function provided for privacy protection by adjusting the brightness of illumination provided within the display unit 151 or adjusting a direction of illumination. The quiet function refers to a function of controlling components included in the output unit 150 not to generate an output, as well as deactivating the display unit 151. Unlike the sleep function, when the quiet function is executed, although a new event occurs, the controller 180 cannot generate an output according to the occurrence of the event. However, by releasing the quiet function, the user can check an event which has been generated while the quiet function was executed.

Also, the power-off function refers to a function of turning off power of the mobile terminal 100. In addition, the window-off function may be a function of stopping displaying of an executed screen output to positions to which tap gestures are applied. When the window-off function is executed, the controller 180 can terminate driving of an application corresponding to the executed screen, as well as terminating displaying of the executed screen. Thus, the user can terminate an executed application through the window-off function using tap gestures.

In addition, when the functions are executed, the mobile terminal has entered modes corresponding to the executed functions. For example, when the sleep function is executed, the mobile terminal has entered a sleep mode or that the sleep mode is activated in the mobile terminal.

Meanwhile, control functions previously matched according to the characteristics of tap gestures may be set to any one of the sleep function, the private function, the quiet function, the power-off function, and the window-off function. However, the present inventive is not limited thereto and the control functions may be variously modified.

Figure 6:
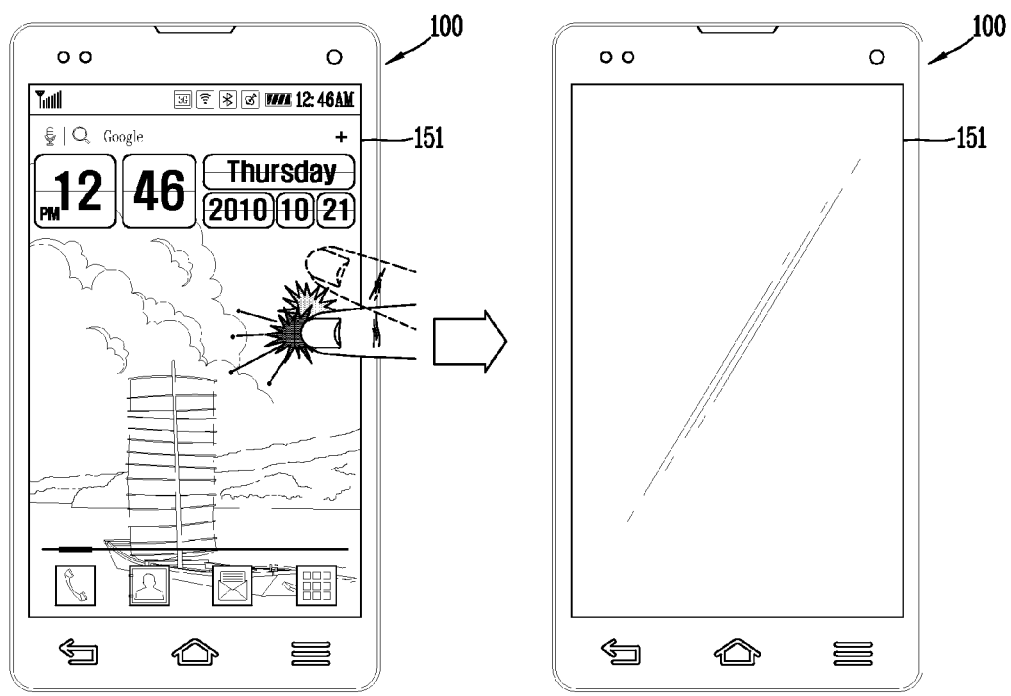
FIG. 6 is a conceptual view illustrating an example of an operation of deactivating a display unit in response to tap gestures in the mobile terminal according to an embodiment of the present invention.

Next, FIG. 6 is a conceptual view illustrating an example of an operation (sleep function) of deactivating the display unit 151 in the mobile terminal 100 according to an embodiment of the present invention. Referring to FIG. 6, an executed screen, an idle screen, a lock screen, or the like, corresponding to one or more functions may be output to the display unit. When screen information is output to the display unit 151, and tap gestures are sensed, the controller 180 can deactivate the display unit 151.

When the tap gestures are applied, if the one or more functions have been executed in the mobile terminal, the controller 180 can terminate at least one of the functions. In an embodiment, when tap gestures are applied to an empty space of an executed screen output to the display unit 151, the controller 180 can deactivate the display unit 151. For example, when a home screen including an object such as an icon is output as an executed screen, a region in which an icon is not output may be an empty space. This it to prevent malfunction of the terminal.

Also, when the tap gestures are applied, the controller 180 can display a function list corresponding to functions currently being executed on the display unit 151. Thereafter, whether to terminate the executed function or whether to deactivate only the display unit 151 can be determined in response to tap gestures applied thereafter. For example, when two tap gestures are applied, the controller 180 can terminate all the currently executed functions and deactivate the display unit 151. In addition, when three tap gestures are applied, the controller 180 can deactivate only the display unit 151, while maintaining the currently executed functions as is.

As described above, when the sleep function is executed in response to tap gestures, the controller 180 can deactivate the display unit 151 when a lock screen, an executed screen of an application, or the like, is displayed.

Figure 7A:
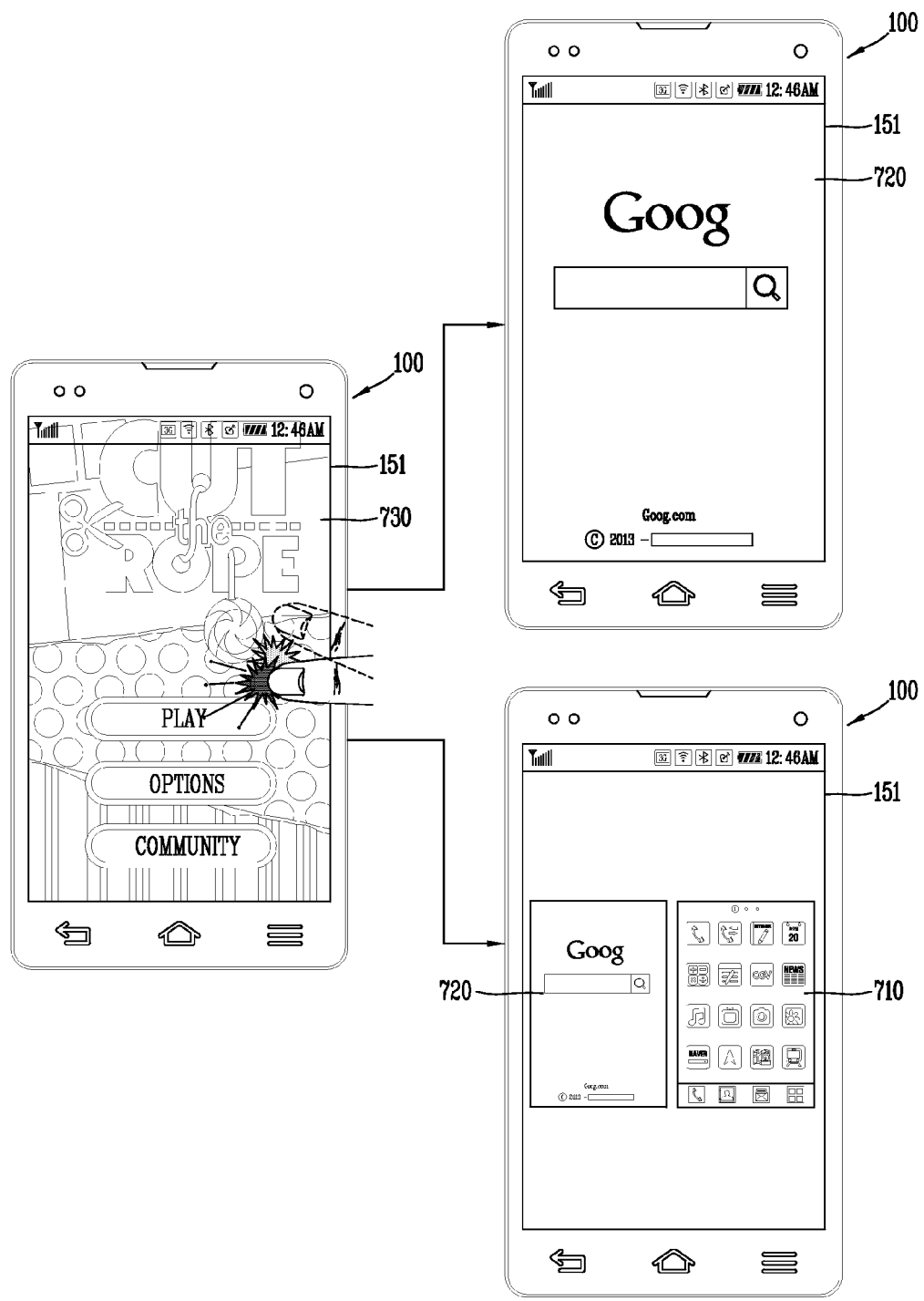
FIGS. 7A and 7B are conceptual views illustrating an example of operations of controlling functions corresponding to screen information output to the display unit in the mobile terminal according to an embodiment of the present invention.
Figure 7B:
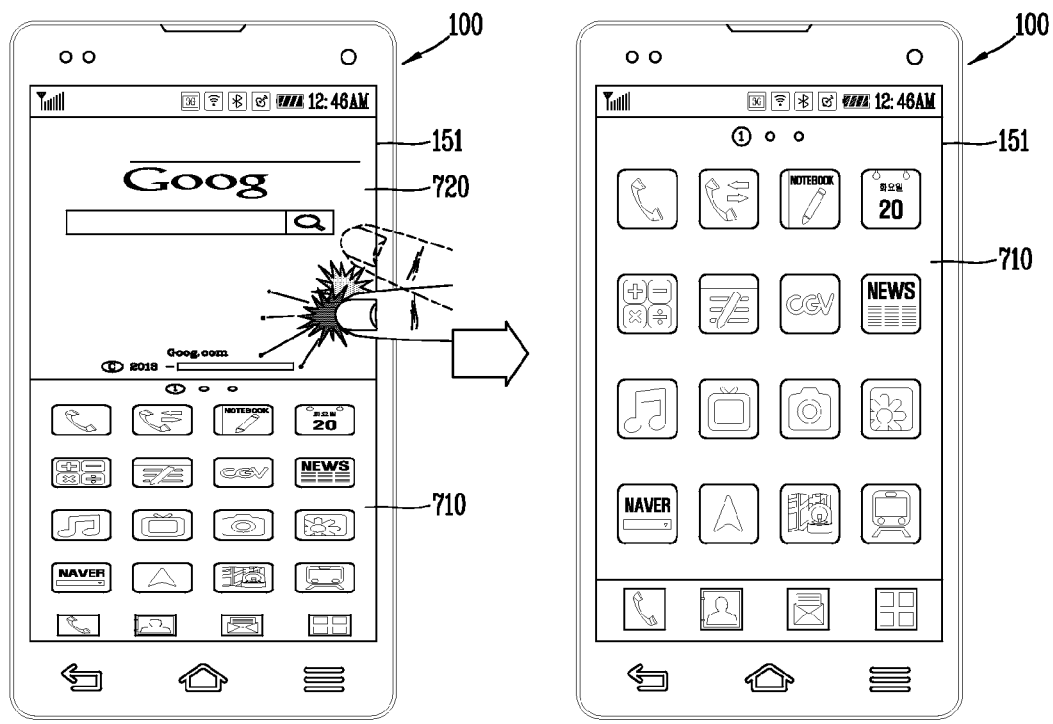

Next, FIGS. 7A and 7B are conceptual views illustrating an example of operations (window-off function) of controlling functions corresponding to screen information output to the display unit 151 in the mobile terminal 100 according to an embodiment of the present invention.

Referring to FIG. 7A, the controller 180 can execute an application and output an executed screen of the application on the display unit 151. For example, when an application such as a photo album, image capturing, a Web browser, or the like, is executed, a corresponding executed screen can be output to the display unit 151.

Here, the controller 180 can control a function corresponding to an executed screen output to a point to which the tap gestures have been applied. For example, the controller 180 can terminate displaying of the executed screen in a position to which the tap gestures have been applied, and terminate driving of the application corresponding to the executed screen. Such a control function may be called a window-off function.

As the displaying of particular executed screen is terminated, the controller 180 can output an executed screen of an application, which has been the most recently executed and not terminated, to the display unit 151.

For example, a first application, a second application, and a third application may be executed in order. When an executed screen 730 is output according to execution of the third application, when tap gestures are sensed, the controller 180 can terminate driving of the third application. The controller 180 can output an executed screen 720 of the second application, which has been most recently executed and not terminated, to the display unit 151.

In another example, when a plurality of applications has not been terminated, the controller 180 can output thumbnail images of the respective applications to the display unit 151. Namely, when driving of the third application is terminated, the controller 180 can arrange the thumbnail images 710 and 720 corresponding to the first and second applications in executed order.

In this instance, when any one of the thumbnail images output to the display unit 151 is selected, the controller 180 can output an executed screen of an application corresponding to the selected one of the thumbnail images.

Meanwhile, when no application is driven, the controller 180 can output a home screen to the display unit 151. The home screen refers to an idle screen of the mobile terminal 100 including icons or widgets of applications installed in the mobile terminal 100.

Referring to FIG. 7B, a plurality of executed screens are output to the display unit 151. For example, first and second executed screens 710 and 720 corresponding to first and second application, respectively, are output to the display unit 151.

In this instance, with the first and second executed screens 710 and 720 output, and tap gestures are applied to a position at which the second executed screen 720 is output, the controller 180 can terminate displaying of the second executed screen 720. Also, the controller 180 can terminate driving of the application corresponding to the second executed screen 720.

Further, when the displaying the second executed screen 720 among the plurality of executed screens output to the display unit 151, the controller 180 can change a display size of the first executed screen 1 which has not been terminated. For example, as the displaying of the second executed screen 720 is terminated, the first executed screen 720, which has not been terminated, may be maximized in size.

Thus, the mobile terminal 100 according to an embodiment of the present invention provides a novel interface for controlling an application through a simple method.

Figure 8A:
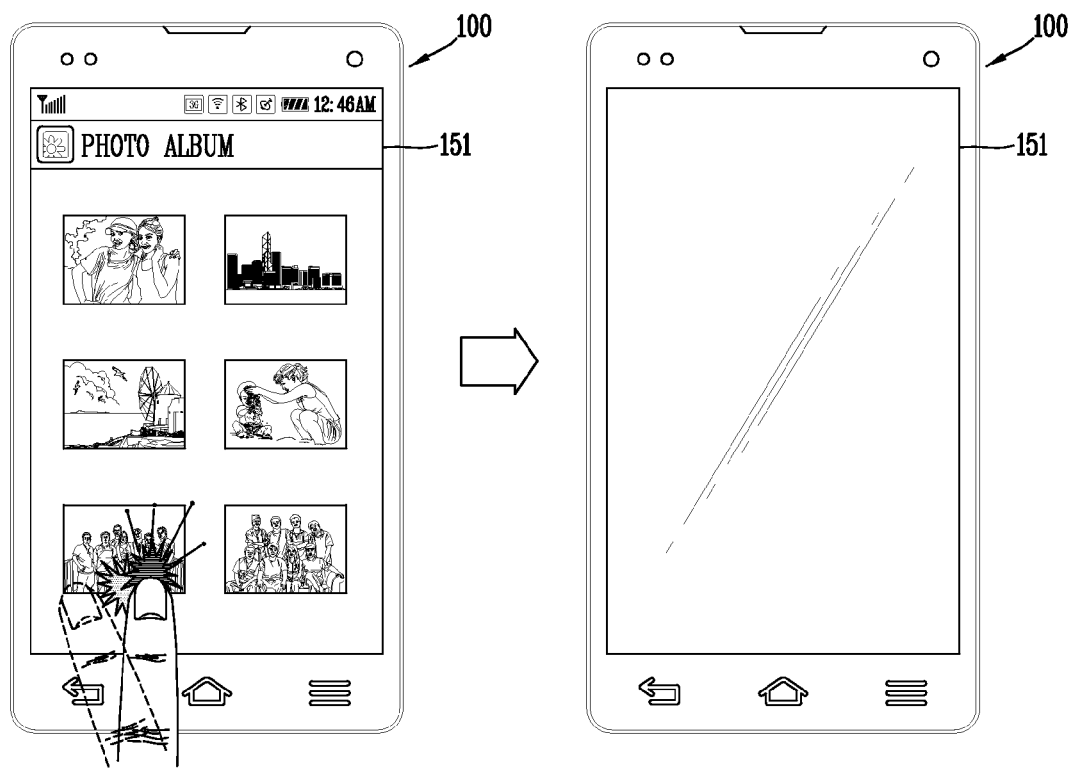
FIGS. 8A and 8B are conceptual view illustrating examples of operations of the mobile terminal executing different functions according to the number of points to which tap gestures are simultaneously applied.
Figure 8B:
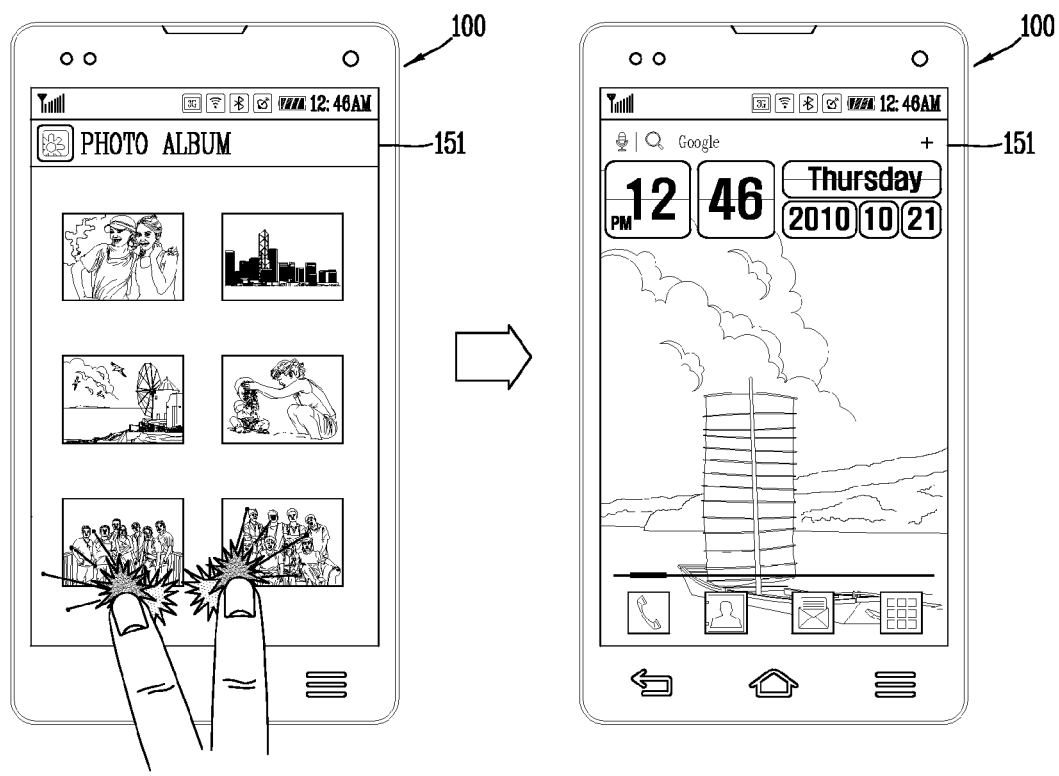

Next, FIGS. 8A and 8B are conceptual view illustrating examples of operations of the mobile terminal executing different functions according to the number of points to which tap gestures are simultaneously applied. Referring to FIGS. 8A and 8B, when an application (e.g., a photo album) is executed, a corresponding executed screen is output to the display unit 151.

With the executed screen of the application displayed, the controller 180 can execute different control functions corresponding to screen information displayed on the display unit 151 according to the number of points to which tap gestures are simultaneously applied. Namely, although the same executed screen is displayed, different functions may be controlled according to the number of points to which tap gestures are applied.

Referring to FIG. 8A, when the number of points to which tap gestures are applied is one, a sleep function may be executed, and referring to FIG. 8B, when the number of points to which tap gestures are applied is two, a window-off function may be executed. The control function according to the number of points to which tap gestures are applied may vary according to an embodiment.

Meanwhile, when tap gestures are applied to two points, i.e., first and second points, different control functions may be executed according to a distance between the first and second points. For example, when the distance between the first and second points is longer than a reference distance, an executed screen output to the display unit 151 may be magnified about a central point between the first point and the second point.

Conversely, when the distance between the first and second points is shorter than the reference distance, the executed screen can be reduced about the central point. In this instance, the executed screens may be magnified or reduced in proportion to a difference between the distance between the first and second points and the reference distance.

Namely, referring to FIGS. 8A and 8B, control functions differently matched according to the number of the points to which tap gestures are applied can be executed.

Figure 9A:
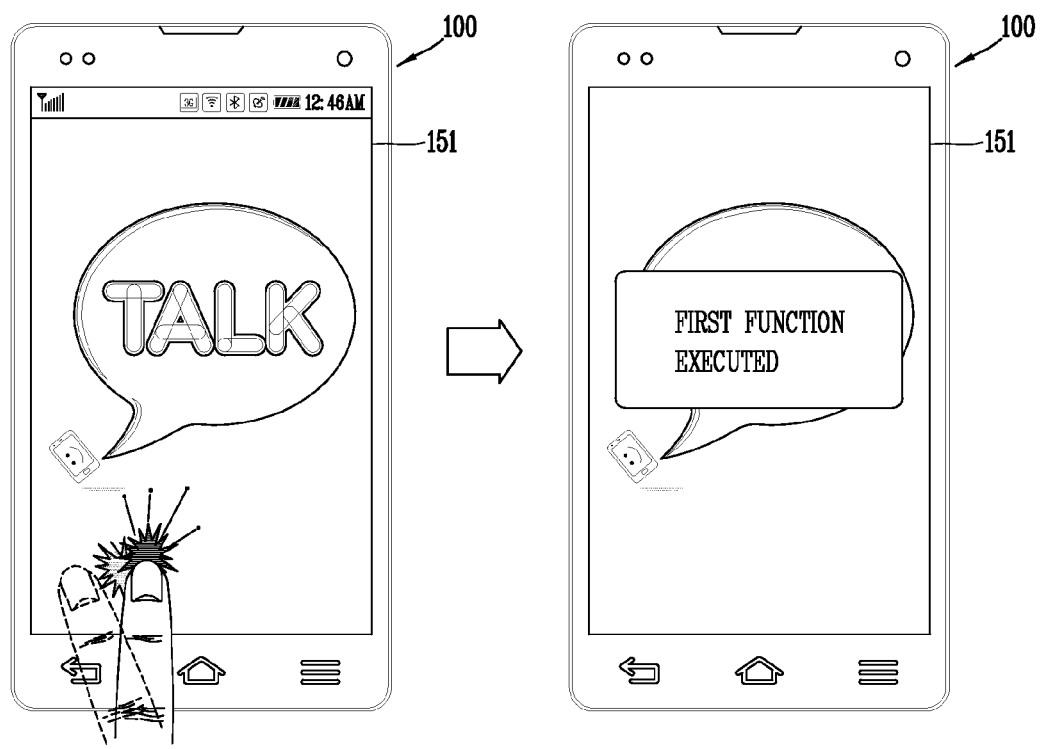
FIGS. 9A and 9B are conceptual views illustrating examples of operations of the mobile terminal outputting function information as tap gestures are sensed.
Figure 9B:
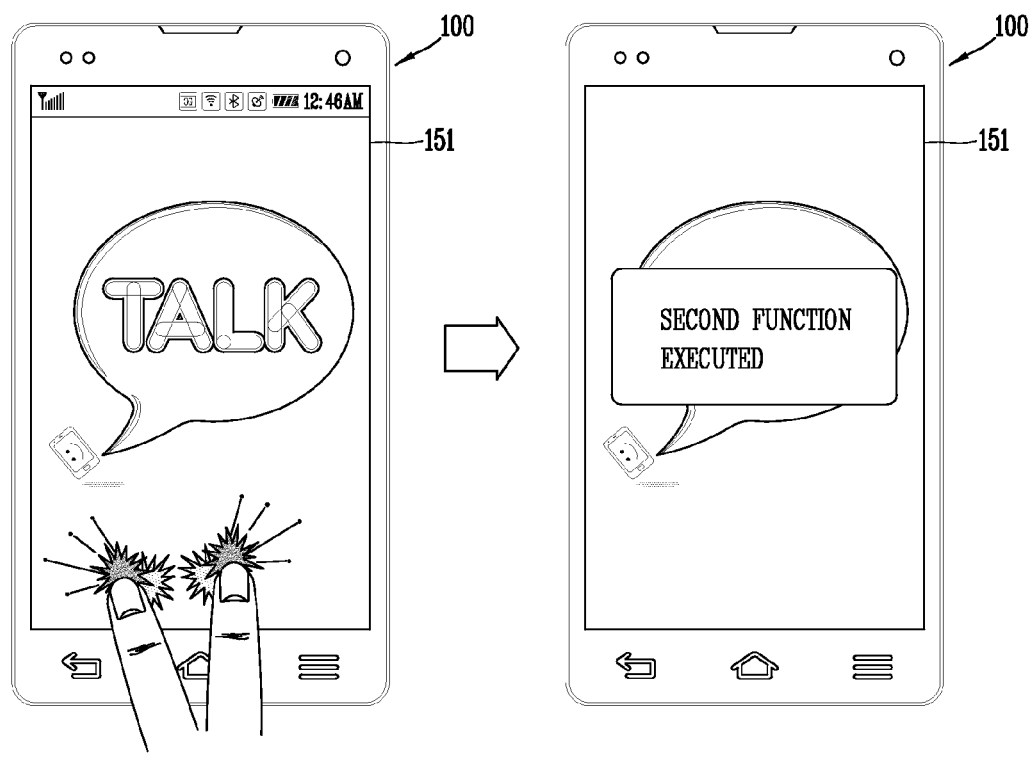

FIGS. 9A and 9B are conceptual views illustrating examples of operations of the mobile terminal outputting function information as tap gestures are sensed. When tap gestures are sensed, the controller 180 can output guide information regarding control functions corresponding to the characteristics of the tap gestures. For example, referring to FIG. 9A, when the number of points to which tap gestures are applied is one and a control function corresponding thereto is a first function, guide information related to the first function may be output.

In another example, referring to FIG. 9B, when the number of points to which tap gestures are applied is two and a control function corresponding thereto is a second function, guide information related to the second function may be output. Also, besides the visual method illustrated in FIGS. 9A and 9B, when the number of points to which tap gestures are applied is two and a control function corresponding thereto is a second function, guide information related to the second function may be output.

Further, the guide information may be output in an aural or haptic manner such as a voice or vibration, as well as in the visual manner as illustrated in FIGS. 9A and 9B.

Figure 10:
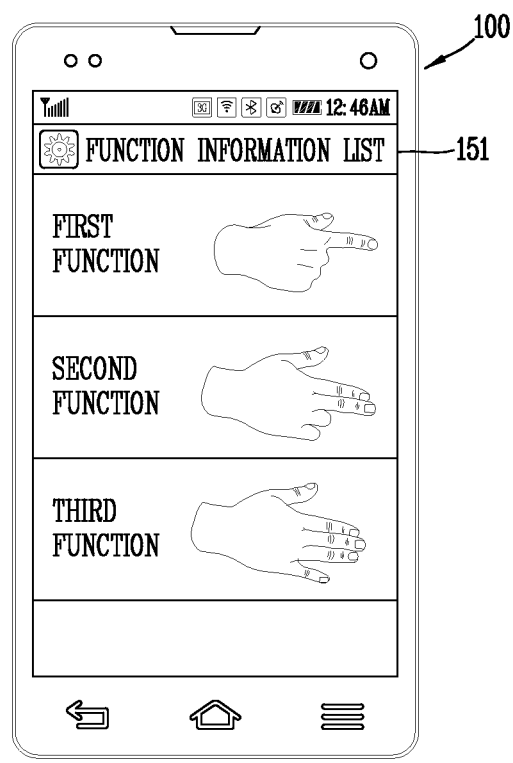
FIG. 10 is a view illustrating the mobile terminal outputting a list of function information matched to characteristics of tap gestures, respectively.

Next, FIG. 10 is a view illustrating the mobile terminal outputting a list of function information matched to characteristics of tap gestures, respectively. The memory 160 of the mobile terminal 100 according to an embodiment of the present invention may store information (hereinafter, 'referred to as function information') related to different control functions to be executed according to characteristics of tap gestures.

When a user request or tap gestures are applied, the controller may output a function information list to the display unit 151 with reference to the function information stored in the memory 160. The function information list may include at least one function information, and the function information may include information regarding characteristics of tap gestures corresponding to a title of a control function to be executed, a description of the control function, and a precondition under which the control function is to be executed.

For example, the first function may be a sleep function and may be executed when two tap gestures are successively applied to one point. In another example, the second function may be a window-off function and may be executed when two tap gestures are successively applied to two points.

The function information stored in the memory 160 may be edited based on a user input. For example, when the first function is set as a sleep function, the first function may be changed into a power-off function. In another example, when the second function is set to be executed when two tap gestures are successively applied to two points, the second function may be changed to be executed when three tap gestures are successively applied to one point.

In a specific example of editing function information, the controller 180 can include at least one function information stored in the memory 160 in the function information list according to a user request or when pre-set tap gestures are applied. In this instance, the controller 180 can output a menu icon formed to edit at least one function information together with the function information list. When a touch input applied to the menu icon is sensed, the controller 180 can select at least one function information and output an editing menu with respect to the at least one selected function information. The user may edit a type of a control function, characteristics of tap gestures as conditions for executing the control function, and the like, by using the editing menu.

Thus, because at least one function information included in the function information list may be edited according to a user input, the user is provided with an optimized interface.

Figure 11:
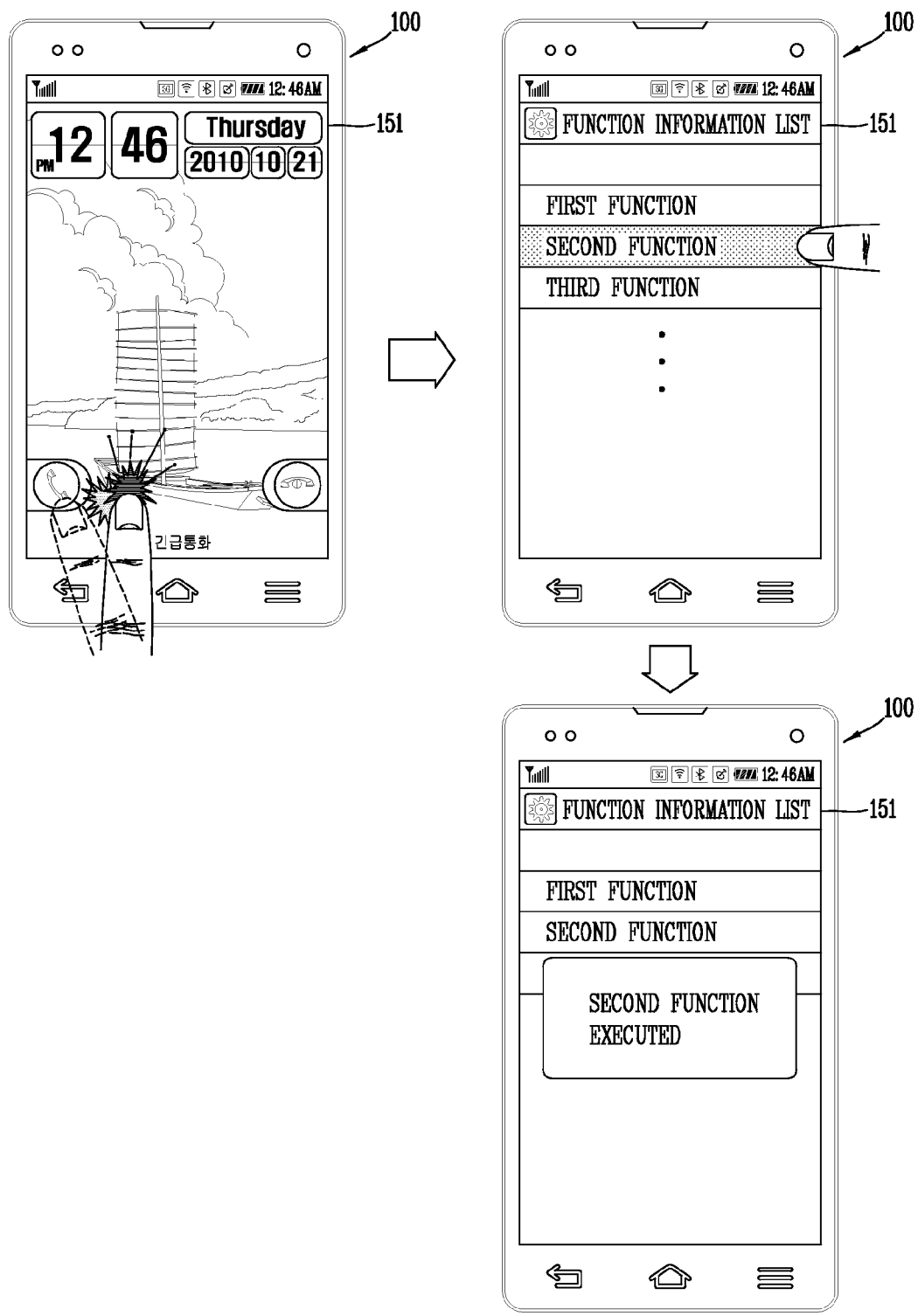
FIG. 11 is a conceptual view illustrating an example of an operation of outputting a list of function information in response to tap gestures in the mobile terminal according to an embodiment of the present invention.

FIG. 11 is a conceptual view illustrating an example of an operation of outputting a list of function information in response to tap gestures in the mobile terminal according to an embodiment of the present invention. Referring to FIG. 11, when executed screens are output as one or more functions are executed, and tap gestures are sensed, the controller 180 can output a function information list corresponding to different tap gestures with reference to the function information stored in the memory 160.

In a specific example, when the display unit 151 in a deactivated state is activated according to a user manipulation, a lock screen may be output to the display unit 151. The lock screen may be a screen output to the display unit 151 in a lock mode of the terminal, in which inputs other than an input for unlocking, are limited. Namely, when the lock screen is output, inputting is limited, and thus execution of a control function according to an input may be limited.

When the lock screen is output to the display unit 151, and tap gestures are applied to the display unit 151, the controller 180 can output a function information list. The function information list may include at least one control function matched to the characteristics of tap gestures. Even when an executed screen of an application, instead of the lock screen is output, the function information list may be output.

When any one of functions included in the function information list is selected, the controller 180 can execute a control function corresponding to the selected function. For example, when a second function set as a private function is selected, the controller 180 can control illumination within the display unit 151 to have pre-set brightness such that surrounding people cannot view the display unit 151. Also, the controller 180 can output guide information according to the execution of the second function.

Thereafter, when the same tap gestures are applied to the display unit 151 of the terminal, the private function is executed. Namely, when the tap gestures are applied to the display unit in the lock screen (or an executed screen of an application), brightness of the display unit 151 may be controlled according to the private function. In this instance, the function information list may be output again only when new types of tap gesture (e.g., tap gestures which are applied to different points or strength of tap gestures are different) are sensed.

However, the present invention is not limited thereto and whenever tap gestures are applied, the function information list may be output and a control function corresponding to the tap gesture may be defined.

Figure 12:
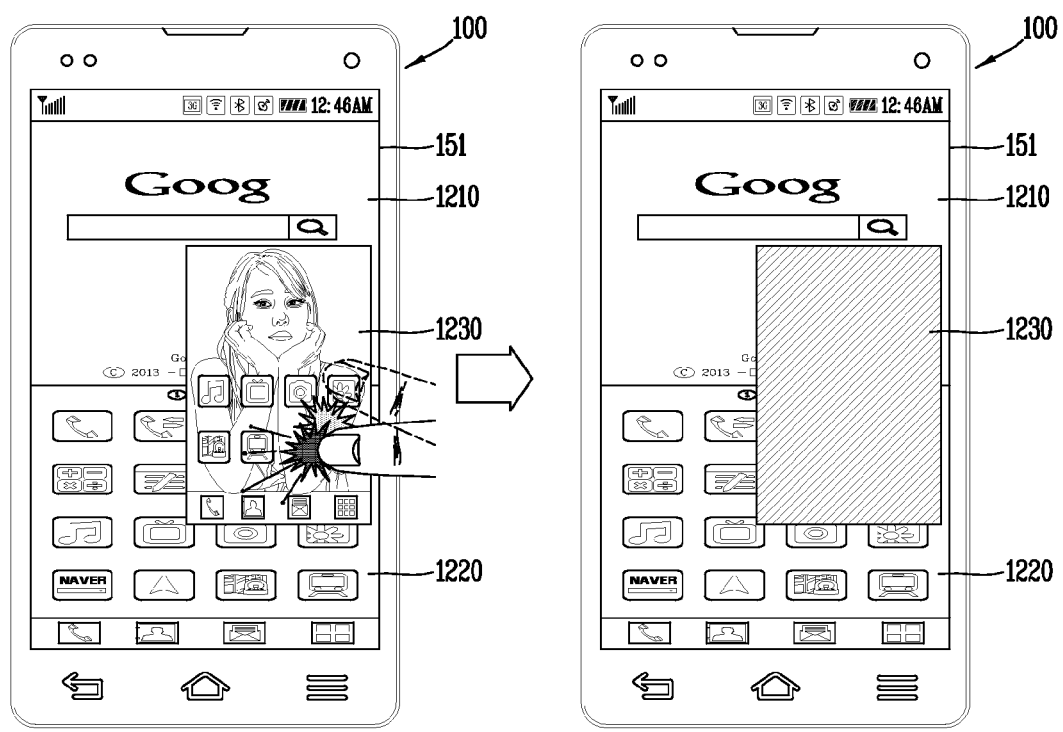
FIG. 12 is a conceptual view illustrating an example of an operation of the mobile terminal in which any one executed screen is controlled by tap gestures when a plurality of executed screens are output.

FIG. 12 is a conceptual view illustrating an example of an operation of the mobile terminal 100 in which any one executed screen is controlled by tap gestures when a plurality of executed screens are output.

When a plurality of executed screens are output, and tap gestures are input, the controller 180 can execute a control function with respect to any one of the executed screens output to a position to which the tap gestures are applied. The executed control function may be a function previously matched to characteristics of the tap gestures. In this instance, the plurality of executed screens may be executed screens of respective multitasking applications.

For example, referring to FIG. 12, the display unit 151 can output first, second and third screens 1210, 1220, and 1230 according to execution of first, second, and third applications. When tap gestures are sensed in a position at which the third screen 1230 is output, the controller 180 can execute a control function corresponding to the tap gestures.

In this instance, the executed screen as a control target may be set by a point to which the user's tap gestures are applied. For example, when the user taps the first screen 1210, the first screen may be a control target, and when the user taps the second screen 1220, the second screen may be a control target.

When a private function is executed by tap gestures will now be described. In this instance, when the user's tap gesture is sensed in the third screen 1230, the controller 180 can adjust the third screen 1230 to have pre-set brightness such that surrounding people cannot view the third screen 1230. Namely, when the first and second screens 1210 and 1220 are maintained, a control function corresponding to tap gestures may be executed only for the third screen 1230.

When the user taps the third screen 1230 again, brightness of the third screen 1230 may be returned to the original brightness. Namely, a control function executed by preceding tap gestures may be released by subsequent tap gestures, and the tap gestures may be applied to the same target (i.e., the third screen in this embodiment).

FIGS. 13A, 13B, and 13C are conceptual views illustrating examples of operations of the mobile terminal executing different functions according to target points of tap gestures. The controller 180 can execute different control functions according to a target point of tap gestures.

For example, when tap gestures are applied to a point outside the terminal body, a function related to a sound output among one or more functions being executed may be terminated. Alternatively, when tap gestures are applied to the body of the mobile terminal, a function related to a sound output and screen display, among the one or more functions being executed may be terminated together.

In this instance, an input region of the mobile terminal 100 may extend to the outside of the terminal body. Thus, a point at which the sensing unit 140 of the terminal senses the tap gestures in a region outside the terminal body may be a virtual input region.

Also, the virtual input region may have a width which varies according to a place or target in which the terminal is placed or strength of tap gestures. For example, when the terminal is placed on a table, or the like, when the user taps the table, the terminal may move, and accordingly, the tap gestures may be sensed. Thus, when the strength of the tapping is strong, the virtual input region may be increased. In another example, when the user holds the terminal body, the virtual input region may disappear.

In the present embodiment, it is illustrated that different control functions are executed according to target points of the tap gestures within the virtual input region. For example, referring to FIG. 13A, when an application related to alarm is executed, an executed screen related to alarm is output to the display unit 151 and audio related to alarm is output to the audio output module 153.

In this instance, when tap gestures are sensed in a point outside the terminal body, the controller 180 can terminate only a function related to a sound output. Alternatively, when tap gestures are applied to the body of the mobile terminal, the driving of the application related to alarm may be terminated. Namely, functions related to a sound output and a screen display, among functions related to the alarm application may be terminated together.

However, the present invention is not limited to the control targets being varied according to whether tap gestures are applied to outside of the terminal body. For example, different control functions may be executed according to a distance between a target point to which tap gestures are applied and the terminal. In more detail, in the example of FIG. 13A, when tap gestures are applied to a point between a first target point TP1 in 13A(a) and a second target point TP2 in 13A(b), a selection window for selecting any one of a control function of (a) and a control function of (b) may be output.

In another example, referring to FIG. 13B, the controller 180 can terminate a function related to a sound output or may terminate functions related to a sound output and a screen display together in a call signal connection mode according to target points of tap gestures. In more detail, when an application related to call reception is executed, an executed screen including information regarding a counterpart terminal may be output to the display unit 151 and a call reception sound may be output to the audio output module 153.

In this instance, when user's tap gestures are applied to a point outside the body of the terminal, the controller 180 can terminate the function related to the sound output, and when user's tap gestures are applied to the body of the terminal, the controller 180 can terminate both the sound output and the executed screen of the call signal connection mode together. Thus, the call signal connection mode may be completely terminated.

According to a target point of tap gestures, the controller 180 can terminate the function related to the sound output or may terminate the functions of both the sound output and the screen display.

In another example, referring to FIG. 13C, the present invention can also be applied to an application related to video play. As illustrated, an application related to a video play may be executed in the terminal according to a user manipulation.

When tap gestures are sensed in a point outside the terminal body, the controller 180 can stop only an audio output and may continuously play a video. Alternatively, when tap gestures are applied to the body of the terminal, the controller 180 can temporarily stop the video play or may stop driving of the application related to the video play.

In another example, according to which of a central region and an edge region tap gestures are applied, different controlling may be performed. As illustrated in FIG. 13C(b), when tap gestures are applied to the edge region of the body of the terminal, video play may be temporarily stopped, and when tap gestures are applied to the central region of the body of the terminal, the driving of the application related to the video play may be stopped.

As illustrated, according to whether a target point of tap gestures is within the body of the terminal or within a virtual input region outside the body of the terminal, according to where the target point is within the body of the terminal, or according to how far the target point is from the body of the terminal, different control functions may be performed.

Figure 14:
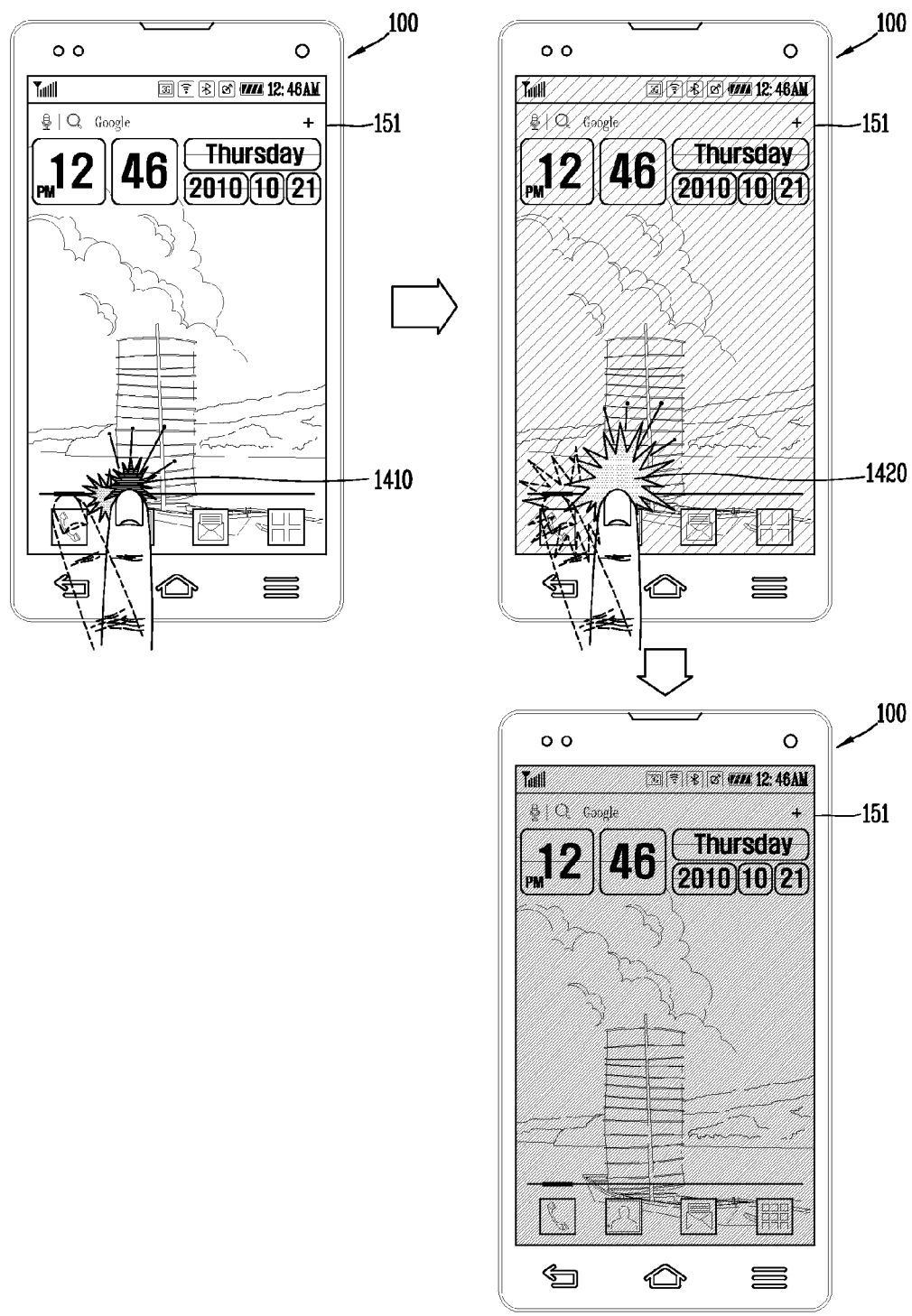
FIG. 14 is a conceptual view illustrating an example of an operation of the mobile terminal in which different functions are performed according to strength of tap gestures.

Next, FIG. 14 is a conceptual view illustrating an example of an operation of the mobile terminal in which different functions are performed according to strength of tap gestures. The controller 180 can digitize strength of applied tap gestures and execute different control functions according to strength of the tap gestures.

In more detail, the strength of tap gestures may be divided into a plurality of levels, and different control functions may be set according to each level of the strength. For example, the strength of tap gestures may be classified into first and second levels corresponding to first and second functions, respectively, and when strength of sensed tap gestures corresponds to the first level, the first function may be executed. Also, when the strength of sensed tap gestures corresponds to the second level, the second function may be executed.

For example, as illustrated in FIG. 14, when the brightness of the display unit 151 is set according to previously input conditions, and the user applies tap gestures having first strength 1410, the brightness of the display unit 151 can be reduced. In this instance, the reduced brightness may have a first level. Next, when the user applies tap gestures having a second strength 1420, the brightness of the display unit 151 can be reduced to have a second level. In this instance, the first level may be defined to be higher than the second level.

In the above description, tap gestures each having first and second strengths are sequentially applied is illustrated, but the present invention is not limited thereto. For example, in the first state of FIG. 14, as the tap gestures having the first or second strength 1410 or 1420 are applied, the display unit 151 may be changed to have brightness having the first or second level.

In another example, a direction in which a function is controlled may be changed according to strength of tap gestures. In more detail, when tapping having the first strength is applied to the terminal through tap gestures, the brightness may be increased, and when tapping having the second strength is applied to the terminal, the brightness may be reduced. Based on this, the user can increase or reduce brightness.

In another example, a function may be set to be controlled according to the strength of tap gestures. Namely, an application as a control target may vary according to a level of strength. For example, when a music play application is being driven, the music play application may be controlled by tap gestures having the first strength, and whether to activate the display unit 151 may be controlled by tap gestures having the second strength.

Figure 15:
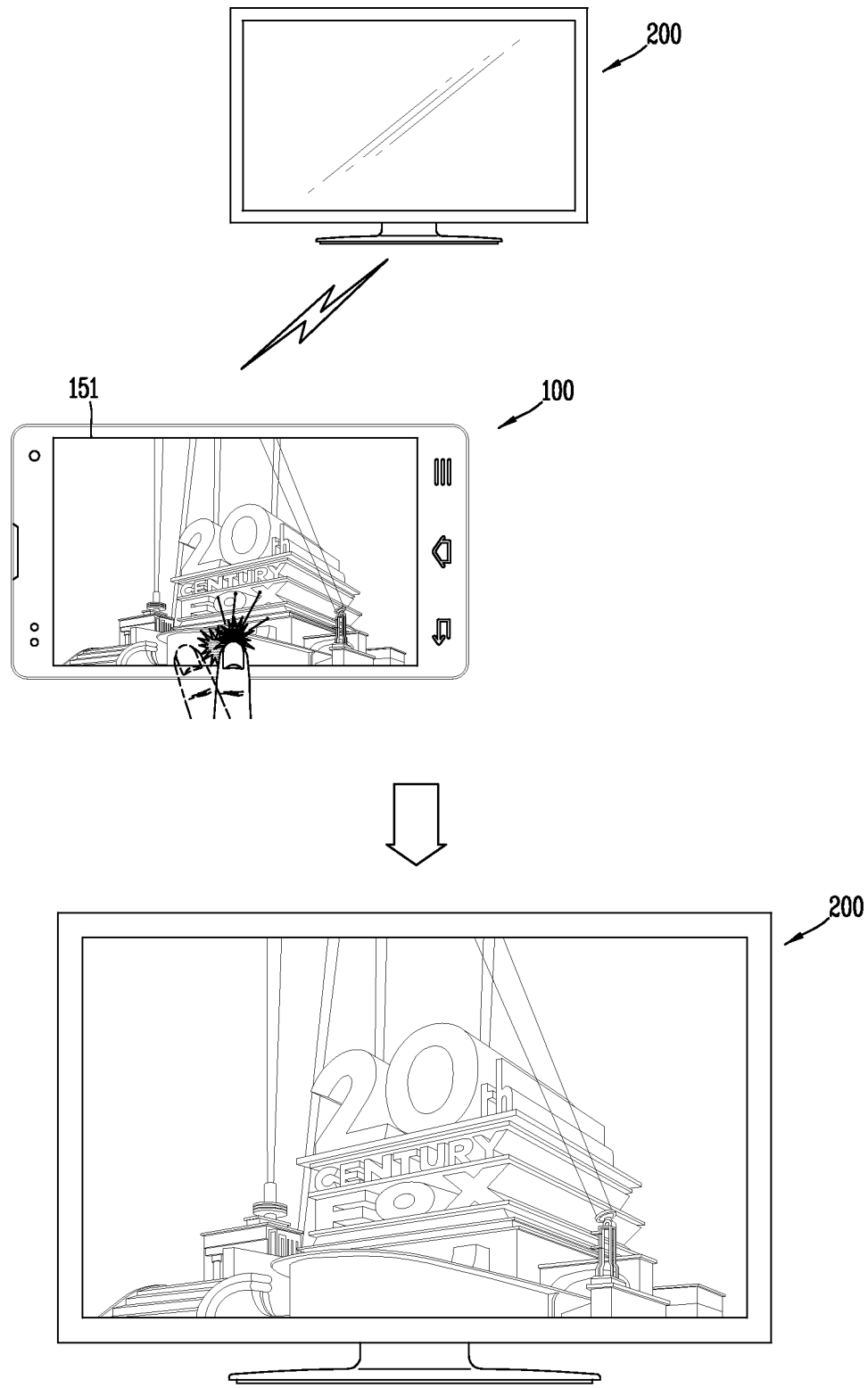
FIG. 15 is a conceptual view illustrating an example of the mobile terminal in which a function is performed according to tap gestures when the mobile terminal is paired with an external device.

Next, FIG. 15 is a conceptual view illustrating an example of the mobile terminal in which a function is performed according to tap gestures when the mobile terminal is paired with an external device. The mobile terminal may be paired with an external device 200 such as a television. Paring refers to connection between two or more devices to exchange data. For example, the mobile terminal 100 and the television 200 may be paired through short range communication. As the short range communication technology, Bluetooth™, radio frequency identification (RFID), infrared data association (IrDA), ultra wideband (UWB), ZigBee™, or the like, may be used.

Also, the mobile terminal 100 may be paired with the external device 200 such as a television through data communication such as Wi-Fi, or the like. For example, the mobile terminal 100 and the external device 200 may be paired by the medium of a base station of data communication, a sharer, or the like.

Meanwhile, when tap gestures are sensed when one or more functions of the mobile terminal are being executed, the terminal may control at least one of the one or more functions being executed, in association with the external device.

For example, in a paired state, when tap gestures are sensed in the mobile terminal 100, the controller 180 can control the wireless communication unit 110 to output the executed screen, which is being output to the display unit 151, to the external device 200 and deactivate the display unit 151. Namely, the paired external device 200, instead of the mobile terminal 100, may output the executed screen generated by the controller 180 of the mobile terminal 100.

In more detail, when a video is played by the mobile terminal 100, the mobile terminal 100 may transmit a video output command to the television based on sensed tap gestures. Also, the mobile terminal 100 can transmit data corresponding to the video to the television. In this instance, the television can be switched to a state in which it can play the video transmitted from the mobile terminal 100, from a state in which the display unit is deactivated, from a state in which a different image is output, or the like. Accordingly, the user may select a video output device in a simple manner like tap gestures.

Figure 16A:
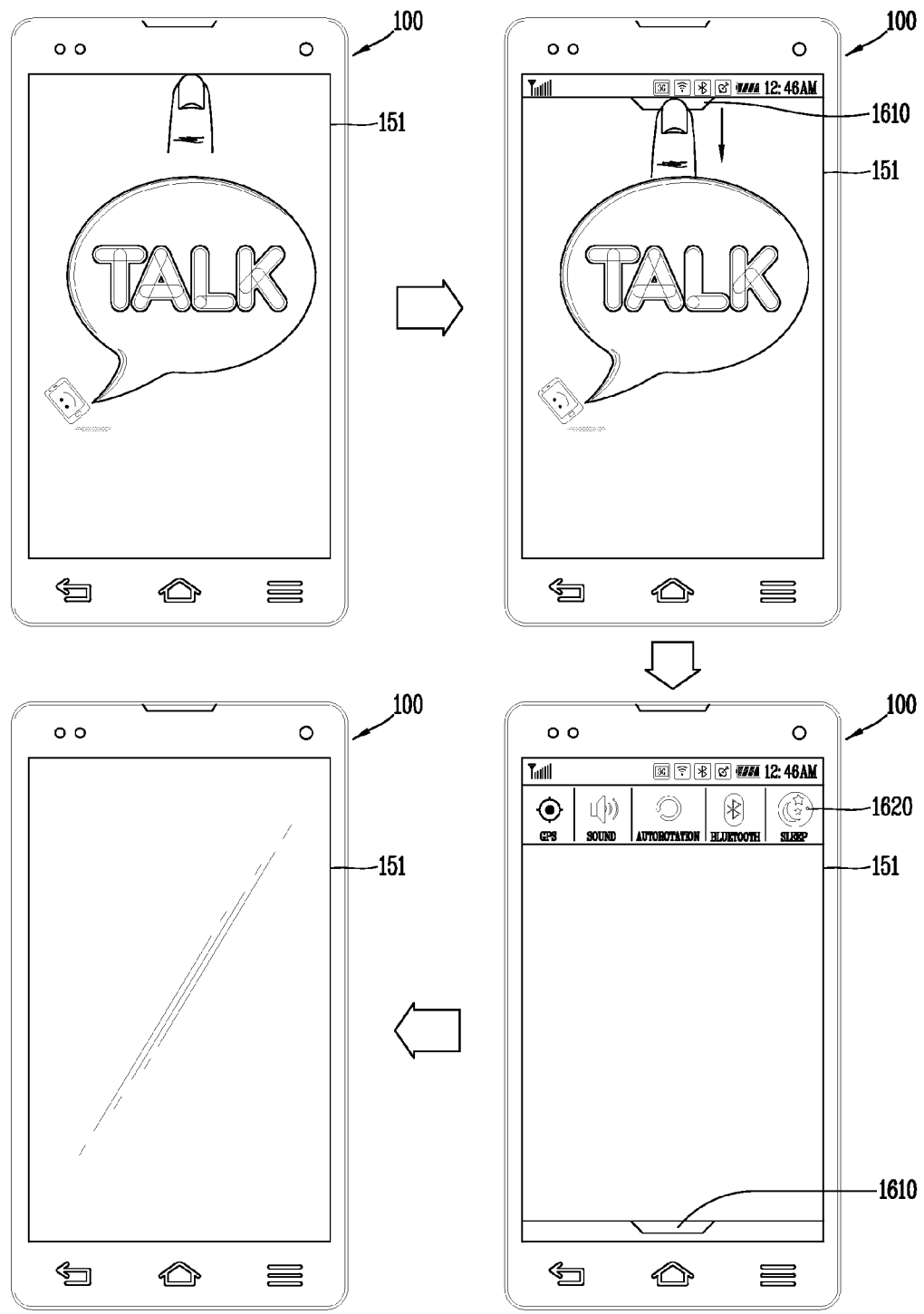
FIGS. 16A, 16B, and 16C are conceptual views illustrating examples of operations of the mobile terminal outputting an object formed to deactivate the display unit.
Figure 16B:
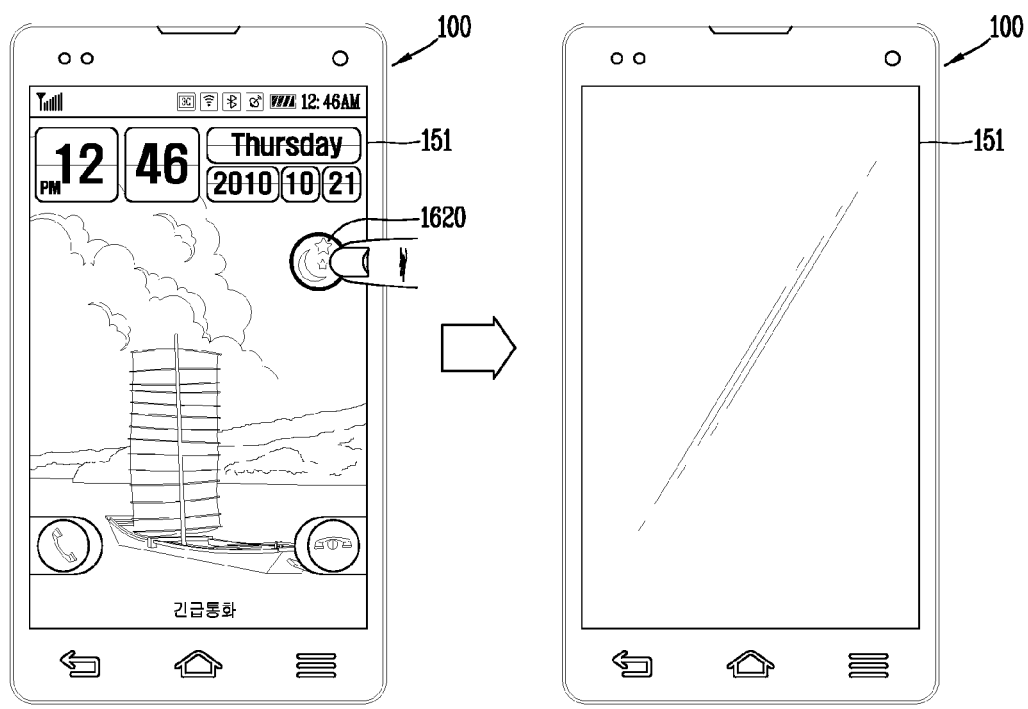
Figure 16C:
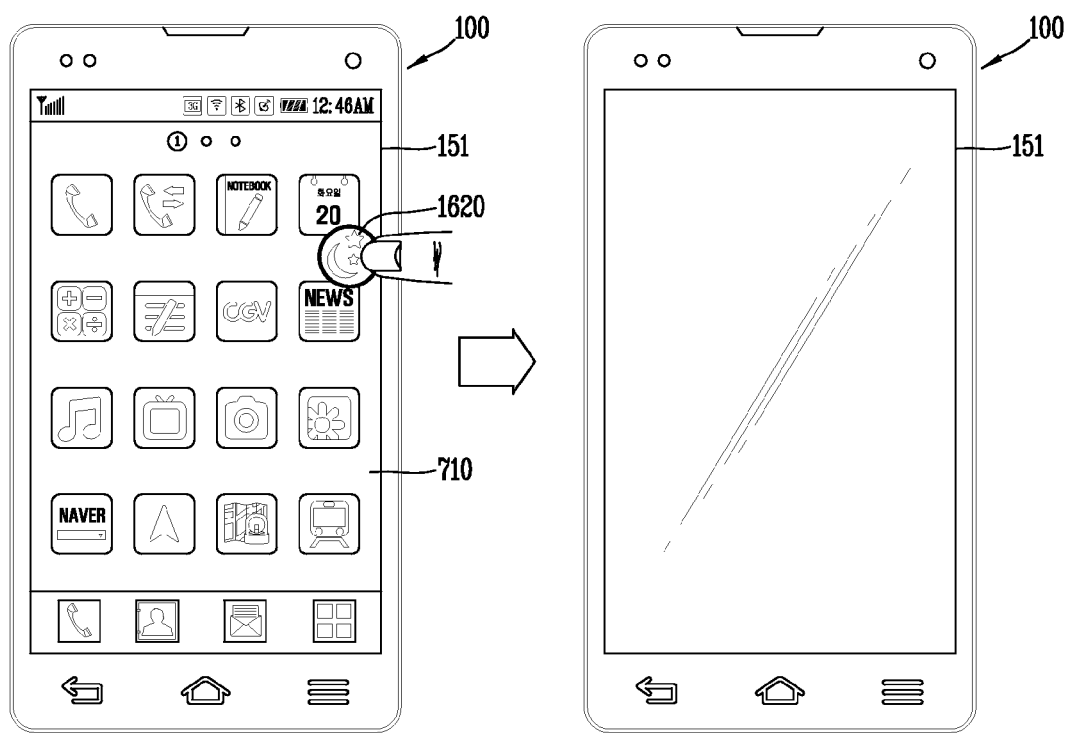

FIGS. 16A, 16B, and 16C are conceptual views illustrating examples of operations of the mobile terminal outputting an object formed to deactivate the display unit. Referring to FIG. 16A, as one or more control functions are executed, executed screens may be output to the display unit 151. At this time, in response to a touch sensed from one end of the display unit 151, the controller 180 can output at least a portion of a curtain window 1610 to the display unit 151.

Thereafter, when the touch continuously moves from a first point to a second point, the controller 180 can change a display region of the curtain window 1610 based on the movement of the touch. For example, when the touch continuously moves from a point in an upper end of the display unit 151 downwardly, a display region of the curtain window 1610 may be magnified up to a position at which the touch is terminated. Namely, an animation effect that the curtain window 1610 descends from the upper end may be generated.

Meanwhile, the curtain window 1610 may include icons related to controlling of the terminal, and may further include a graphic object 1620 formed to deactivate the display unit 151. For example, when a touch is applied to the graphic object 1620, the controller 180 can execute a sleep function. That is, the controller 180 can deactivate the display unit 151 in response to a user input with respect to the graphic object 1620.

Referring to FIG. 16B, the lock screen described above with reference to FIG. 11 may be output to the display unit 151. The lock screen may include a keypad for inputting an icon or a password for unlocking the terminal. Besides, the lock screen may further include the graphic object 1620 formed to deactivate the display unit 151. In this instance, when a touch is applied to the graphic object 1620, the controller 180 can execute a sleep function.

Referring to FIG. 16C, the home screen described above with reference to FIG. 7 may be output to the display unit 151. The home screen may also be referred to as an idle screen, and when the mobile terminal 100 is in an idle state, the home screen may be output to the display unit 151.

The home screen may include at least one object. The object may be an icon or a widget of an application installed in the mobile terminal. In addition, the home screen may include a plurality of pages according to the number of applications according to a user selection or installed in the mobile terminal, and at least one of the plurality of pages may be output to the display unit 151 according to a user selection.

The home screen may also include at least one of an identification information region in which identification information regarding a page output to the display unit 151 is displayed, a state information region in which state information of the mobile terminal 100 is displayed, and a pre-set region in which an icon of a pre-set application is displayed.

In the identification information region, identification information indicating which of the plurality of pages a currently output page corresponds to may be displayed. Further, in the state information region, at least one of antenna information of the mobile terminal 100, communication mode information, battery information, information regarding a generated event, information regarding a pre-set function, and time information may be displayed.

In the pre-set region, icons or widgets corresponding to particular applications previously set according to a user selection or previously set by the controller 180 can be fixedly displayed. A background screen can also be output to the display unit 151 according to a user selection or according to a setting of the controller 180, and the controller 180 can control the display unit 151 to display the background screen and the home screen in an overlap manner.

In the mobile terminal 100 according to an embodiment of the present invention, the home screen may further include the graphic object 1620 formed to deactivate the display unit 151. The graphic object 1620 may be output in a partial region of the home screen, and a position at which the graphic object 1620 is output may be changed by a touch-and-drag input.

When the graphic object 1620 overlaps with an icon or a widget included in the home screen, the controller 180 can output the graphic object 1620 in the uppermost stage of a stepwise arrangement, or may change an output position or a size thereof such that it does not overlap with the icon or the widget.

Also, the graphic object 1620 may be included in the home screen or may not according to a setting mode. The setting mode may be altered based on a user input. When the graphic object 1620 is displayed in the home screen, when a touch is applied to the graphic object 1620, the controller 180 can execute a sleep mode and deactivate the display unit 151.

The home screen may include at least one of an identification information region in which identification information regarding a page output to the display unit 151 is displayed, a state information region in which state information of the mobile terminal 100 is displayed, and a pre-set region in which an icon of a pre-set application is displayed.

As described above, in the mobile terminal according to an embodiment of the present invention, when continued tap gestures are sensed within a reference time, functions matched to the characteristics of the tap gestures are executed, whereby a novel user interface allowing for simply controlling function of the mobile terminal can be provided.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of transmission via the Internet.

The mobile terminal according to the embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a wireless communication unit configured to wirelessly communicate with at least one other terminal;
a touch screen configured to:
display, on the touch screen in an activated state in which illumination is applied to the touch screen, one of a home screen including at least one icon linked to a preset function, an application execution screen in full screen of an application corresponding to the linked preset function, and a lock screen displaying an input area for entering an input for unlocking the mobile terminal,
receive a tapping gesture including first and second taps consecutively applied to the touch screen in the activated state,
in response to receiving the tapping gesture on an empty space of the home screen on which the icon is not displayed while in the active state in which illumination is applied to the touch screen, deactivate illumination of the touch screen by switching the touch screen from the activated state to an inactive state in which illumination is not applied to the touch screen,
in response to receiving the tapping gesture on an empty space of the lock screen on which the input area is not displayed while in the active state in which illumination is applied to the touch screen, deactivate illumination of the touch screen by switching the touch screen from the activated state to an inactive state in which illumination is not applied to the touch screen, and
in response to receiving the tapping gesture on the application execution screen, activate a predetermined function associated with the application and not switch the touch screen from the activated state to the inactivated state,
wherein when the touch screen is switched from the activated state to the inactivated state, the touch screen is automatically switched to the inactivated state without further input.

2. The mobile terminal of claim 1, wherein when a second tapping gesture occurs on an object outside of the mobile terminal, the controller is further configured to mute sound output on the mobile terminal.

3. The mobile terminal of claim 1, wherein the controller is further configured to:
terminate the function corresponding to the application execution screen without switching the touch screen from the activated state to the inactivated state based on the received tapping gesture on the application execution screen.

4. The mobile terminal of claim 1, wherein the controller is further configured to:
reduce a brightness of the application execution screen without switching the touch screen from the activated state to the inactivated state based on the received tapping gesture on the application execution screen.

5. The mobile terminal of claim 1, wherein the touch screen in the inactivated state corresponds to a lower power mode on the mobile terminal.

6. The mobile terminal of claim 1, wherein the controller is further configured to:

close the application execution screen without switching the touch screen from the activated state to the inactivated state based on the received tapping gesture on the application execution screen.

7. The mobile terminal of claim 1, wherein the controller is further configured to:
   receive an incoming event when the touch screen is in the inactivated state, and
   output information indicating the incoming event has been received without switching the touch screen to the activated state.

8. The mobile terminal of claim 1, wherein the controller is further configured to:
   display a selectable graphic object on the home screen for switching the touch screen from the activated state to the inactivated state.

9. The mobile terminal of claim 8, wherein the selectable graphic object is moveable on the touch screen based on a touch and drag input on the selectable graphic object.

10. A method of controlling a mobile terminal, the method comprising:
    displaying, via a touch screen in an activated state in which illumination is applied to the touch screen, one of a home screen including at least one icon linked to a preset function, an application execution screen in full screen of an application corresponding to the linked preset function, and a lock screen displaying an input area for entering an input for unlocking the mobile terminal;
    receiving, via a controller of the mobile terminal, a tapping gesture including first and second taps consecutively applied to the touch screen in the activated state;
    in response to receiving the tapping gesture on an empty space of the home screen on which the icon is not displayed while in the active state in which illumination is applied to the touch screen, deactivating illumination of the touch screen by switching the touch screen from the activated state to an inactive state in which illumination is not applied to the touch screen;
    in response to receiving the tapping gesture on an empty space of the lock screen on which the input area is not displayed while in the active state in which illumination is applied to the touch screen, deactivate illumination of the touch screen by switching the touch screen from the activated state to an inactive state in which illumination is not applied to the touch screen, and
    in response to receiving the tapping gesture on the application execution screen, activate a predetermined function associated with the application and not switching the touch screen from the activated state to the inactivated state,
    wherein when the touch screen is switched from the activated state to the inactivated state, the touch screen is automatically switched to the inactivated state without further input.

11. The method of claim 10, wherein when a second tapping gesture occurs on an object outside of the mobile terminal, the method further comprises muting sound output on the mobile terminal.

12. The method of claim 10, further comprising:
    terminating the function corresponding to the application execution screen without switching the touch screen from the activated state to the inactivated state based on the received tapping gesture on the application execution screen.

13. The method of claim 10, further comprising:
    reducing a brightness of the application execution screen without switching the touch screen from the activated state to the inactivated state based on the received tapping gesture on the application execution screen.

14. The method of claim 10, wherein the touch screen in the inactivated state corresponds to a lower power mode on the mobile terminal.

15. The method of claim 10, further comprising:
    closing the application execution screen without switching the touch screen from the activated state to the inactivated state based on the received tapping gesture on the application execution screen.

16. The method of claim 10, further comprising:
    receiving, via a wireless communication unit of the mobile terminal, an incoming event when the touch screen is in the inactivated state; and
    outputting information indicating the incoming event has been received without switching the touch screen to the activated state.

17. The method of claim 10, further comprising: display a selectable graphic object on the home screen for switching the touch screen from the activated state to the inactivated state.

18. The method of claim 17, wherein the selectable graphic object is moveable on the touch screen based on a touch and drag input on the selectable graphic object.

* * * * *